(12) United States Patent
Yoshikawa

(10) Patent No.: US 11,146,748 B2
(45) Date of Patent: Oct. 12, 2021

(54) IMAGING DEVICE

(71) Applicant: JVCKENWOOD Corporation, Yokohama (JP)

(72) Inventor: Hiroshi Yoshikawa, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 20 days.

(21) Appl. No.: 16/773,731

(22) Filed: Jan. 27, 2020

(65) Prior Publication Data

US 2020/0244902 A1 Jul. 30, 2020

(30) Foreign Application Priority Data

Jan. 29, 2019 (JP) .............................. JP2019-013096
Jan. 29, 2019 (JP) .............................. JP2019-013097
Jan. 29, 2019 (JP) .............................. JP2019-013098
Jan. 29, 2019 (JP) .............................. JP2019-013099

(51) Int. Cl.
*H04N 5/365* (2011.01)
*H04N 5/369* (2011.01)
*H04N 17/00* (2006.01)
*H04N 5/361* (2011.01)

(52) U.S. Cl.
CPC .......... *H04N 5/3658* (2013.01); *H04N 5/361* (2013.01); *H04N 5/36963* (2018.08); *H04N 5/379* (2018.08)

(58) Field of Classification Search
None
See application file for complete search history.

(56) References Cited

U.S. PATENT DOCUMENTS 9,838,637 B2 * 12/2017 Muto ................ H01L 27/14634
2017/0353676 A1 12/2017 Kobayashi et al.

FOREIGN PATENT DOCUMENTS

JP 2014-057196 A 3/2014

* cited by examiner

*Primary Examiner* — Mark T Monk
(74) *Attorney, Agent, or Firm* — Procopio, Cory, Hargreaves & Savitch LLP

(57) ABSTRACT

An imaging device includes pixel units, a control unit, and a correction unit. The control unit causes each pixel unit to output first and second signal. The first signal is a potential of a floating diffusion held when the charge accumulated in a photoelectric conversion unit is transferred upon a transfer switch being closed. The second signal is a potential of the floating diffusion held when a reset switch is closed with the transfer switch being open. The correction unit generates, with respect to the first and second signals output by each pixel unit, the pixel signal by subtracting a correction amount from a signal intensity of the first signal. The correction amount is a product of a signal intensity of the second signal and a coefficient determined in advance in accordance with a position of each pixel unit.

6 Claims, 21 Drawing Sheets

| TRAINING DATA NUMBER | TEMPERATURE | AMPLIFICATION GAIN | CHARGE ACCUMULATION PERIOD | OB REGION SIGNAL OUTPUT | LIGHT-RECEIVING REGION SIGNAL |
|---|---|---|---|---|---|
| NO.1 | 15°C | 14dB | 1/60 SECONDS |  | 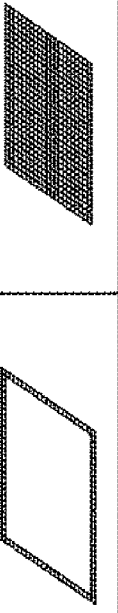 |
| NO.2 | 14°C | 14dB | 1/60 SECONDS |  |  |
| ... | ... | ... | ... | ... | ... |
Fig. 22

IMAGING DEVICE

CROSS REFERENCE TO RELATED APPLICATION

This application is based upon and claims the benefit of priorities from Japanese patent application No. 2019-013096, 2019-013097, 2019-013098 and 2019-013099, filed on Jan. 29, 2019, the disclosure of which is incorporated herein in its entirety by reference.

BACKGROUND

The present disclosure relates to imaging devices.

An image signal output from an image sensor contains a noise component resulting from a dark current or the like, and this noise component appears as an irregularity in an image unless some processing is performed in particular. Such an irregularity is called dark shading, and various techniques for reducing dark shading have been developed to date (see, for example, Japanese Unexamined Patent Application Publication No. 2014-57196).

SUMMARY

The technique disclosed in Japanese Unexamined Patent Application Publication No. 2014-57196, for example, focuses on a noise component resulting from a variation in a readout circuit and fails to take into consideration a dark-current component that accumulates in a photodiode during a charge accumulation period. Therefore, when an analog gain is increased, a noticeable irregularity remains.

An imaging device according to a specific aspect includes a plurality of pixel units, a control unit configured to control a signal output by each of the plurality of pixel units, and a correction unit configured to correct the signal output by each of the plurality of pixel units to generate a pixel signal. Each of the plurality of pixel units includes a photoelectric conversion unit, a transfer switch configured to transfer a charge generated in the photoelectric conversion unit to a floating diffusion, and a reset switch configured to discharge the charge accumulated in the floating diffusion. The control unit is configured to cause each of the plurality of pixel units to output a first signal and a second signal, the first signal is a potential of the floating diffusion held when the charge accumulated in the photoelectric conversion unit is transferred upon the transfer switch being closed, and the second signal is a potential of the floating diffusion held when the reset switch is closed with the transfer switch being open. The correction unit is configured to generate, with respect to the first signal and the second signal output by each of the plurality of pixel units, the pixel signal by subtracting a correction amount from a signal intensity of the first signal, and the correction amount is a product of a signal intensity of the second signal and a coefficient determined in advance in accordance with a position of each of the plurality of pixel units.

An imaging device according to a specific aspect includes, in a light-receiving pixel region that is configured to receive a subject optical image, a plurality of normal pixels each configured to output a pixel signal corresponding to a quantity of incident light, and a plurality of light-blocking pixels each including a cutoff unit that cuts off the incident light. The plurality of light-blocking pixels is each enclosed on a periphery thereof by the normal pixels and configured to output a pixel signal of a noise component.

An imaging device according to a specific aspect includes an image sensor, a storage unit storing a trained model constructed by training the image sensor in advance, and a generation unit configured to generate image data by correcting an output signal of the image sensor with the use of the trained model. The trained model is configured to, upon receiving output signal information of an optical black (OB) pixel belonging to an optical black region, a detected temperature, and set amplification gain and charge accumulation period, output correction information for an output signal of a normal pixel belonging to a light-receiving region.

An imaging device according to a specific aspect of the present disclosure includes a plurality of pixel units, and a control unit configured to perform, in an alternating manner in each of consecutive frame periods, first frame control of causing each of the plurality of pixel units to output a pixel signal in a first charge accumulation period and second frame control of causing each of the plurality of pixel units to output a pixel signal in a second charge accumulation period that is shorter than the first charge accumulation period. The control unit is configured to, when having received an instruction signal, perform, in a frame period in which the second frame control is to be performed, one of third frame control of causing each of the plurality of pixel units to output a pixel signal in a third charge accumulation period that is longer than the second charge accumulation period but shorter than the first charge accumulation period and fourth frame control of causing each of the plurality of pixel units to output a noise signal indicating a potential of a floating diffusion that has just been reset, instead of the second frame control.

BRIEF DESCRIPTION OF THE DRAWINGS

The above and other aspects, advantages and features will be more apparent from the following description of certain embodiments taken in conjunction with the accompanying drawings, in which:

FIG. 22 is a conceptual diagram illustrating a data structure of training data.

DETAILED DESCRIPTION

Hereinafter, the present disclosure will be described through embodiments of the disclosure. The inventions set forth in the claims, however, are not limited to the following embodiments. Furthermore, not all the configurations described in the embodiments are necessarily essential as means for solving the problem.

Figure 1:
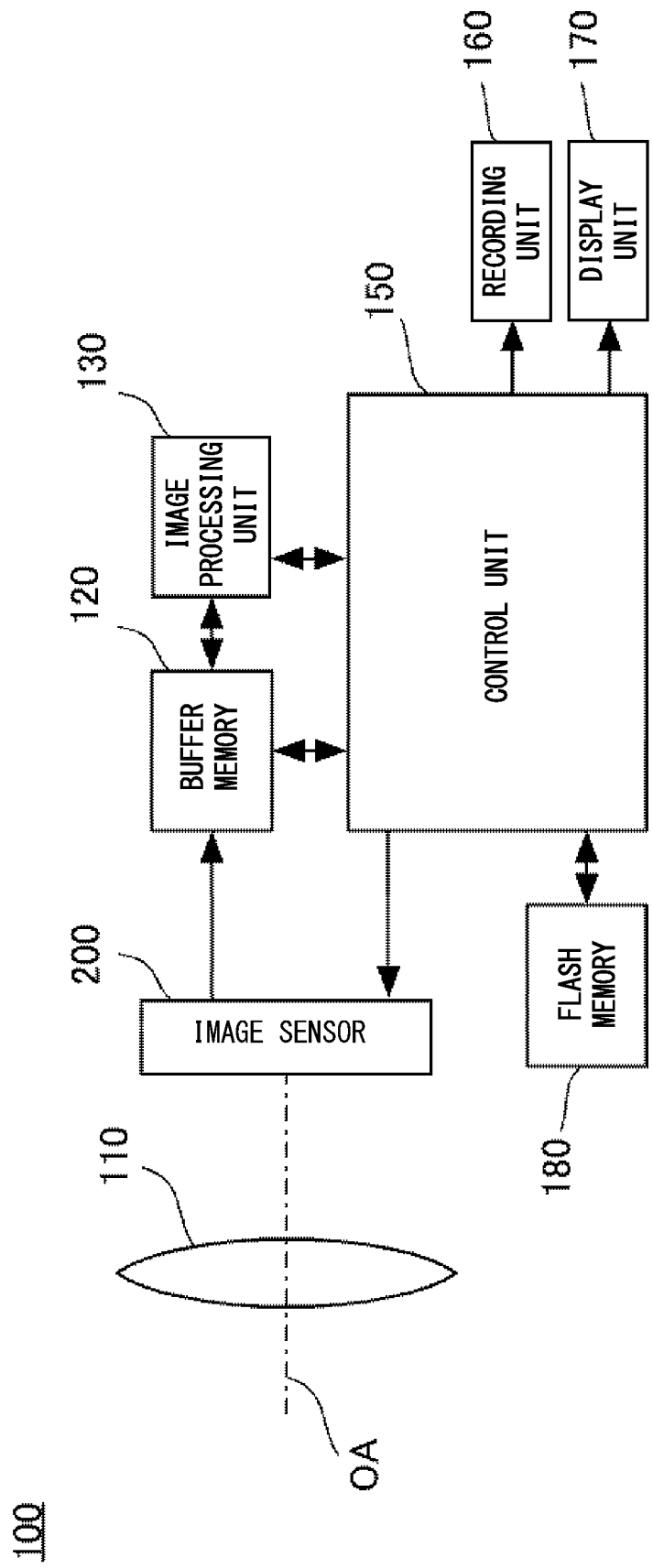
FIG. 1 is a block diagram illustrating a general configuration of an imaging device according to an embodiment.

A first embodiment will be described. FIG. 1 is a block diagram illustrating a general configuration of an imaging device 100 according to the present embodiment. The imaging device 100 is a handheld video camera, for example. The imaging device 100 may also be a terminal device that has an imaging function, such as a smartphone.

The imaging device 100 includes an image capturing lens 110 serving as an imaging optical system. The image capturing lens 110 guides subject light rays incident thereon along an optical axis OA to an image sensor 200. The image capturing lens 110 may be a replaceable lens that can be attached to or removed from the imaging device 100. The imaging device 100 includes mainly a buffer memory 120, an image processing unit 130, a control unit 150, a recording unit 160, a display unit 170, a flash memory 180, and the image sensor 200.

The image sensor 200 is an image sensor that supports a rolling shutter-type electronic shutter and is, for example, a complementary metal-oxide semiconductor (CMOS) sensor. Its specific pixel structure and circuit configuration will be described later. The image sensor 200 converts an output signal output from each pixel to a digital signal by subjecting the output signal to various types of signal processing including the processing described later and sends the digital signal to the buffer memory 120 as pixel data.

The buffer memory 120 is constituted by a volatile high-speed memory, for example. The buffer memory 120 successively receives pixel data from the image sensor 200, lumps together the received pixel data into image data of one frame, and stores the image data. The buffer memory 120 sends image data to the image processing unit 130 on a frame-by-frame basis. The buffer memory 120 also functions as a work memory while the image processing unit 130 performs image processing.

The image processing unit 130 performs various types of image processing on the received image data to generate image data suitable for a predetermined format. For example, when generating moving image data of an MPEG file format, the image processing unit 130 performs white balance processing, gamma processing, and so on on each piece of frame image data and then executes intra-frame and inter-frame compression processing. The generated image data is recorded into the recording unit 160, which is a removable memory card, for example. Furthermore, the generated image data is converted to a display signal by the image processing unit 130, and the converted display signal is displayed on the display unit 170, which is a liquid-crystal panel, for example.

The flash memory 180 stores a control program to be executed by the control unit 150 and various parameter values, functions, lookup tables, and so on to be used in control and computation. The control unit 150 is, for example, a central processing unit (CPU) and controls the imaging device 100 as a whole. The control unit 150 transmits a control signal pertaining to imaging to the image sensor 200.

Figure 2:
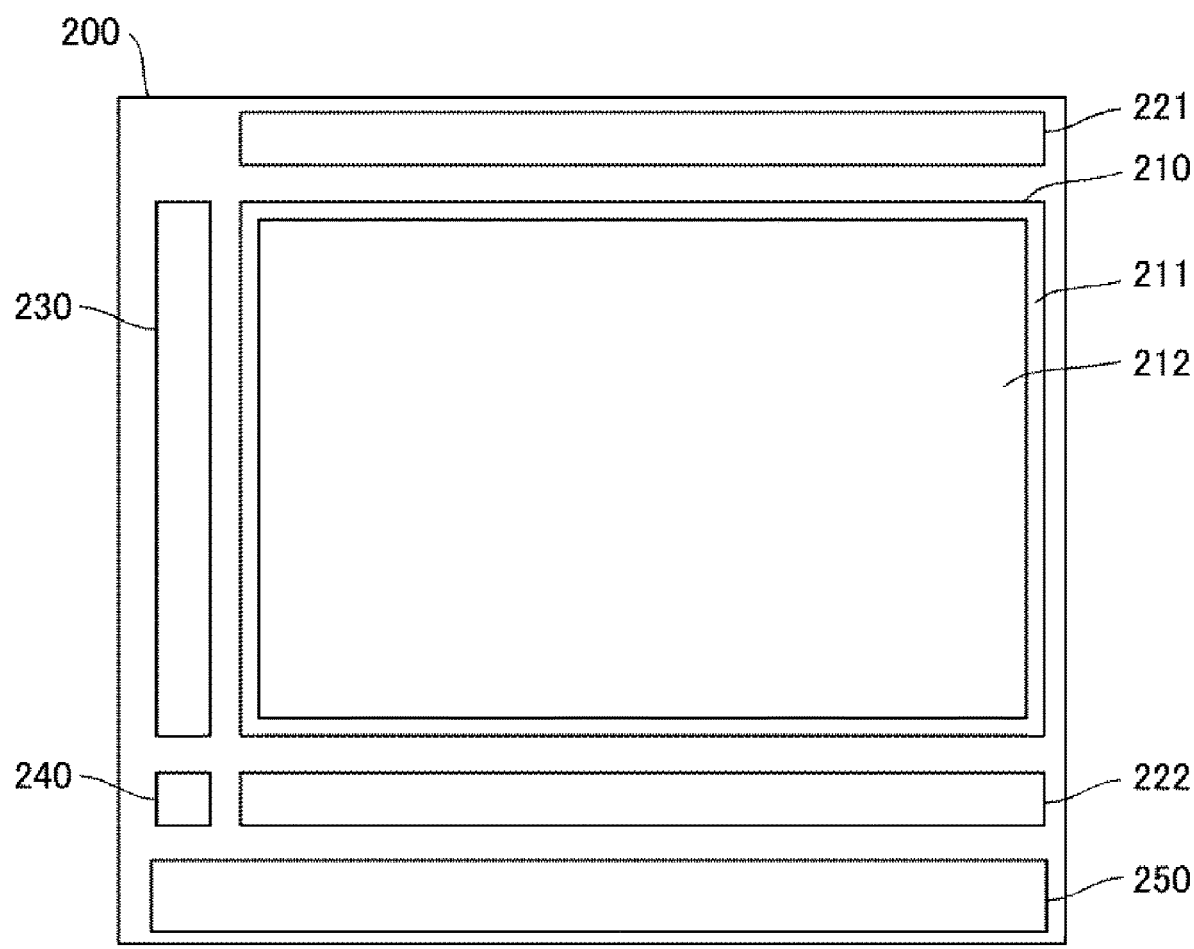
FIG. 2 is a schematic diagram illustrating a general configuration of an image sensor.

FIG. 2 is a schematic diagram illustrating a general configuration of the image sensor 200. The image sensor 200 includes a pixel region 210, where a plurality of pixels are arrayed in a row direction and a column direction. The pixel region 210 includes an optical black region 211 (referred to below as the OB region 211) and a light-receiving region 212. The OB region 211 is so shaded that no incident light reaches the pixels therein. In the light-receiving region 212, light-receiving pixels that photoelectrically convert the incident light are arrayed. The OB region 211 is so provided as to border the periphery of the light-receiving region 212. A pixel signal output from a pixel belonging to the OB region 211 is used to remove fixed pattern noise from a pixel signal output from a pixel belonging to the light-receiving region 212. In the following description, unless noted specifically, dark shading where fixed pattern noise has been removed (referred to below simply as the shading) will be described.

A first readout circuit 221 and a second readout circuit 222 are each a horizontal readout circuit that supports so-called two-channel readout and each include a column readout circuit, an analog gain circuit (analog amplifier), and an analog-to-digital converter (ADC) circuit. A vertical scan circuit 230 selects a row from which signals are to be read out in a pixel array and drives the pixel in each column of the selected row so that the signals of the selected row are read out to the first readout circuit 221 or the second readout circuit 222. The column readout circuit includes a correlated double sampling (CDS) circuit. The CDS circuit performs CDS processing of subtracting the signal intensity corresponding to a noise component from the signal intensity of a photoelectrically converted output signal. The removal of fixed pattern noise with the use of an output of the OB region 211 described above is also carried out as a part of the CDS processing. A temperature sensor 240 is provided in the vicinity of the pixel region 210. The temperature sensor 240 detects the temperature and outputs temperature information to a control circuit 250.

The control circuit 250 controls a signal output by each pixel of the image sensor 200. Specifically, the control circuit 250 controls the timing of charge accumulation and/or the timing of a signal output by controlling switching of various transistors in each pixel (described later) via the column readout circuits in the first readout circuit 221 and the second readout circuit 222 and/or the vertical scan circuit 230. The control circuit 250 also controls the CDS circuit with the use of the temperature information from the temperature sensor 240 and/or adjusts the analog gain in accordance with a command from the control unit 150. Furthermore, the control circuit 250 causes the ADC circuit to convert an adjusted pixel signal and to successively output the converted pixel signal to the buffer memory 120 as pixel data.

Figure 3:
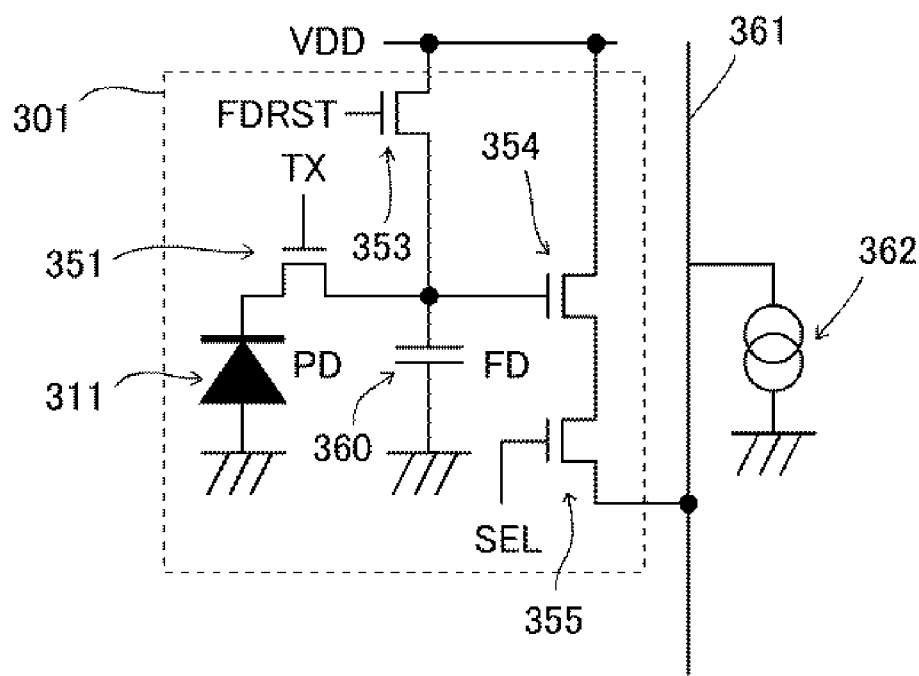
FIG. 3 illustrates a circuit configuration of a pixel unit.

FIG. 3 illustrates a circuit configuration of a pixel unit 301.

The pixel unit 301 is the smallest configuration that performs photoelectric conversion and is also called a pixel. The pixel unit 301 includes mainly a photodiode 311, a transfer transistor 351, a reset transistor 353, an amplification transistor 354, a selection transistor 355, and a floating diffusion 360.

The photodiode 311 is connected to the transfer transistor 351, and the gate of the transfer transistor 351 is connected to a TX wire that supplies a transfer pulse for turning on the transfer transistor 351. The drain of the transfer transistor 351 is connected to the source of the reset transistor 353. The floating diffusion 360 is formed between the drain of the transfer transistor 351 and the source of the reset transistor 353. The floating diffusion 360 is connected to the gate of the amplification transistor 354.

The drain of the reset transistor 353 is connected to a VDD wire to which a power source voltage is supplied, and the gate of the reset transistor 353 is connected to a reset wire to which a reset pulse is supplied. The drain of the amplification transistor 354 is connected to the VDD wire to which a power source voltage is supplied. The source of the amplification transistor 354 is connected to the drain of the selection transistor 355 serving as a readout unit. The gate of the selection transistor 355 is connected to a decoder wire that supplies a selection pulse for turning on the selection transistor 355. The source of the selection transistor 355 is connected to an output wire 361.

A load current source 362 supplies a current to the output wire 361. In other words, when the selection transistor 355 is turned on, the source of the amplification transistor 354 becomes connected to the load current source 362 to operate as a source follower. The load current source 362 is provided as a common element for a plurality of pixels that share the output wire 361. As described above, the transfer transistor 351, the reset transistor 353, and the selection transistor 355 function as switches that close or open upon a transfer pulse, a reset pulse, and a selection pulse, respectively, having been applied thereto or having ceased to be applied thereto. In other words, the transfer transistor 351 functions as a transfer switch, the reset transistor 353 functions as a reset switch, and the selection transistor 355 functions as a selection switch.

Now, two output signals that the pixel unit 301 outputs will be described. One of the two output signals is a first signal of a signal intensity corresponding to the quantity of incident light. The first signal includes shading. The control circuit 250 performs control as follows up to the point when the first signal is output. First, a reset pulse is applied to the reset transistor 353 via the reset wire, and simultaneously a transfer pulse is applied to the transfer transistor 351 via the TX wire. Then, the potential of the photodiode 311 and the potential of the floating diffusion 360 are reset. When the transfer transistor 351 is turned off, the photodiode 311 functions as a photoelectric conversion unit, converts the received incident light to a charge, and accumulates the charge. Thereafter, a reset pulse is applied to the reset transistor 353, and the floating diffusion 360 is reset again. When a selection pulse is applied to the selection transistor 355 immediately thereafter, a reset potential is output to the output wire 361 via the amplification transistor 354 and the selection transistor 355. The output reset potential is saved in the CDS circuit (not illustrated). This reset potential serves as a reference potential.

Thereafter, when a transfer pulse is applied to the transfer transistor 351, the accumulated charges are transferred to the floating diffusion 360, and the potential of the floating diffusion 360 changes from the reset potential to a signal potential to be held after charges are accumulated. When a selection pulse is applied to the selection transistor 355, the signal potential held after charges accumulated is transmitted to the output wire 361 via the amplification transistor 354 and the selection transistor 355. The transmitted signal is subjected to the CDS processing in which the saved reference potential is subtracted from the transmitted signal, and the resulting signal is output to the buffer memory 120 via the analog amplifier and the ADC. The signal output in this manner is the first signal.

The other one of the two output signals is a second signal of a signal intensity corresponding to a portion of the shading. The control circuit 250 performs control as follows up to the point when the second signal is output. First, while the transfer transistor 351 is off, a reset pulse is applied to the reset transistor 353 via the reset wire, and the charges in the floating diffusion 360 are discharged to reset the potential of the floating diffusion 360. Immediately thereafter, a selection pulse is applied to the selection transistor 355, and the reset potential of the floating diffusion 360 is transmitted to the output wire 361 via the amplification transistor 354 and the selection transistor 355. The reset potential is saved in the CDS circuit (not illustrated). This reset potential serves as a reference potential.

Thereafter, with the transfer transistor 351 kept off, a signal is transmitted again to the output wire 361. The transmitted signal is subjected to the CDS processing in which the saved reference potential is subtracted from the transmitted signal, and the resulting signal is output to the buffer memory 120 via the analog amplifier and the ADC. The signal output in this manner is the second signal. The second signal is unrelated to the charge accumulation of the photodiode 311 and thus contains, of shading noise, no dark-current component associated with the photodiode 311. In other words, the second signal is a circuit noise component produced due to a variation of the floating diffusion 360 and any readout circuit portion connected to the floating diffusion 360. The second signal can be output in a short duration while the transfer transistor 351 is off. Therefore, the second signal can be output not only during a period in which the photodiode 311 is accumulating no charge but also during a period in which the photodiode 311 is accumulating charges for causing a first signal to be output. This will be described later in detail.

Figure 4:
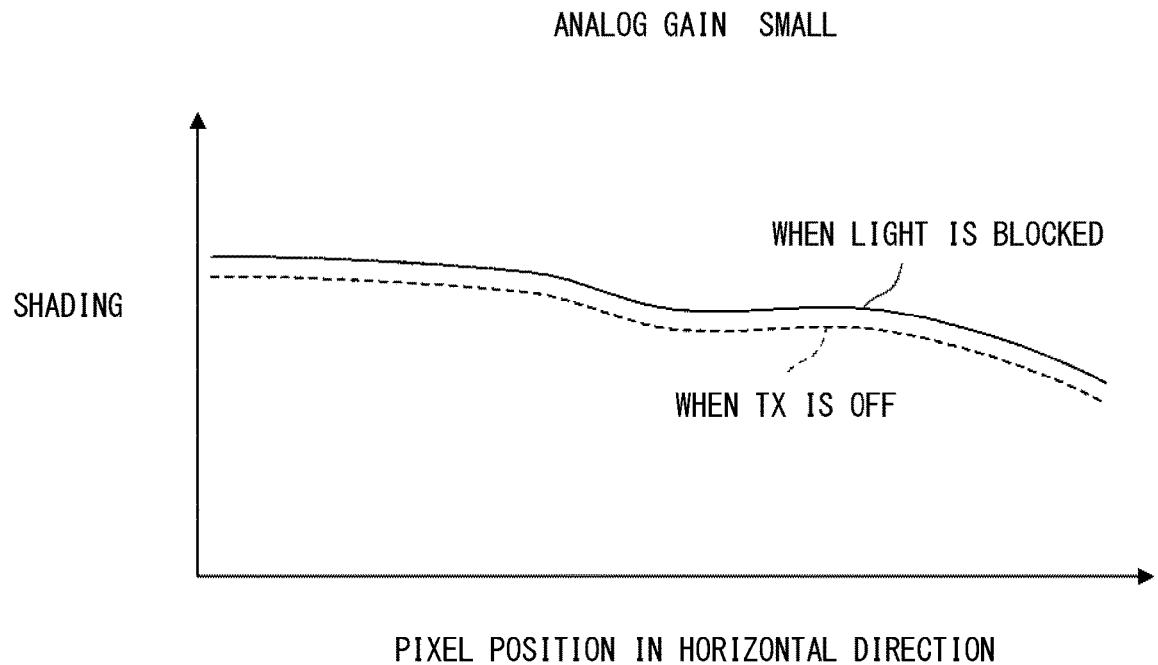
FIG. 4 illustrates shading appearing when an analog gain is small.

For example, shading appearing when charges are accumulated with the image sensor 200 being covered by a shading member to keep any incoming light from becoming incident thereon is, upon fixed pattern noise having been removed therefrom, mainly a dark-current component arising in the photodiode 311 and the circuit noise component described above. FIG. 4 illustrates an example of shading appearing when the analog gain is small. Specifically, with a focus on one row in the light-receiving region 212, the horizontal axis indicates the pixel position, in the horizontal direction, of each pixel belonging to the stated row, and the vertical axis indicates the amount of shading that each pixel outputs.

The solid line represents the shading appearing when charges are accumulated with each pixel kept from having any incoming light becoming incident thereon (when light is blocked), and this shading includes a dark-current component. Meanwhile, the dotted line represents the shading appearing when a second signal is output as described above with the transfer transistor 351 turned off (when TX is off), and this shading includes no dark-current component. FIG.

4 reveals that the proportion of the circuit noise component becomes relatively large when the analog gain is small, and thus the solid line and the dotted line result in similar curves. To be more specific, it can be seen that the above can be expressed, for each pixel, as (shading when light is blocked) ≈α×(shading when TX is off), with the use of a correction coefficient α.

When a moving image is to be captured, it is difficult to acquire the shading corresponding to the solid line by creating a state where the light is blocked between frames. However, by conducting an experiment in advance with the use of the image sensors 200 of an identical product type, or specifically, by collecting data in various conditions in the state where the light is blocked, a relationship between the dotted line and the solid line in the graph, such as the one illustrated in FIG. 4, can be grasped. In other words, the correction coefficient α can be determined in advance through an experiment. If the correction coefficient α is determined in advance, the second signal indicated by the dotted line can be obtained even in a state in which the image sensor 200 is embedded in the imaging device 100, and thus the shading appearing when the light is blocked can be calculated as a predictive value. Accordingly, a pixel signal in which the shading has been substantially corrected can be obtained by subtracting the product of the signal intensity of the second signal and the correction coefficient α from the signal intensity of the first signal corresponding to the quantity of the subject light rays.

Figure 5:
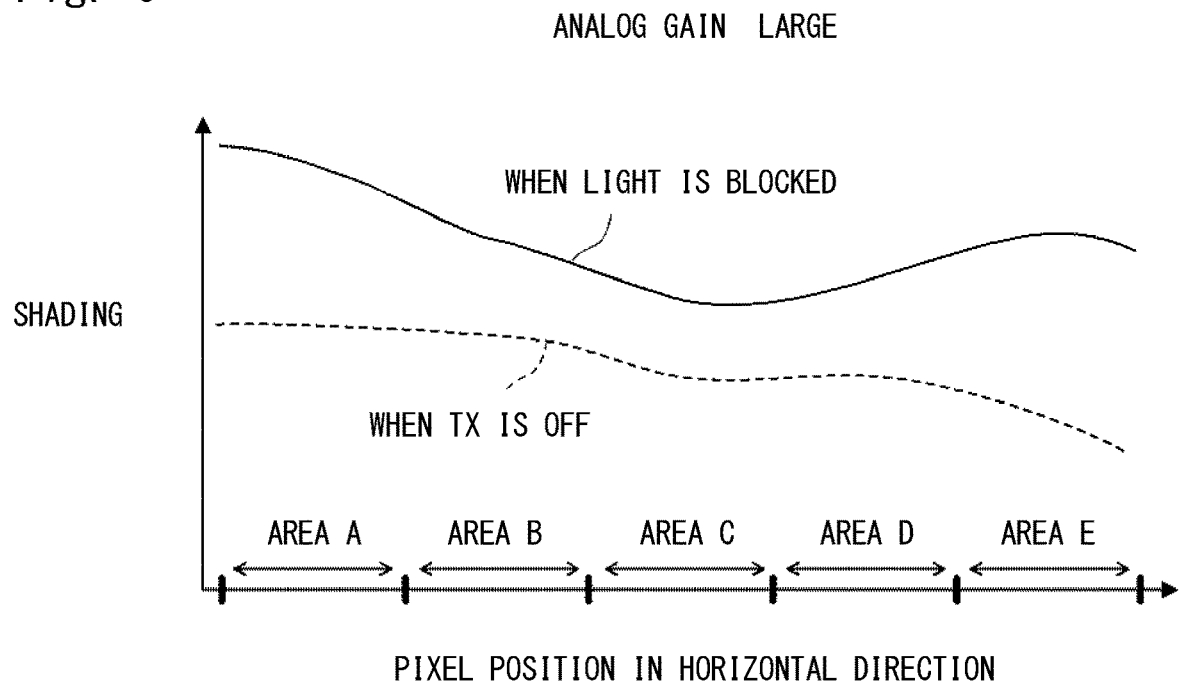
FIG. 5 illustrates shading appearing when an analog gain is large.

FIG. 5 illustrates shading appearing when the analog gain is large. The legends are the same as those in FIG. 4. FIG. 5 reveals that the proportion of the circuit noise component becomes relatively small when the analog gain becomes large, and thus the tendency of the separation between the solid line and the dotted line differs depending on the pixel position. Therefore, the pixels are divided into areas in accordance with the regions where the tendency of the separation is relatively similar. As illustrated in FIG. 5, the pixels are divided into five areas in the horizontal direction to provide, in order from the left, an area A, an area B, an area C, an area D, and an area E, for example. Dividing the pixels in this manner allows correction coefficients $\alpha_A$, $\alpha_B$, $\alpha_C$, $\alpha_D$, and $\alpha_E$ to be defined for the respective areas. For example, the expression for the area A is (shading when light is blocked)≈$\alpha_A$×(shading when TX is off).

If areas are set in the light-receiving region 212 based on the result of an experiment conducted in advance and the correction coefficients are defined for the respective areas, the shading appearing when the light is blocked can be calculated as a predictive value even when the analog gain is large, as in the case in which the analog gain is small. Accordingly, a pixel signal in which the shading has been substantially corrected can be obtained by subtracting the product of the signal intensity of the second signal and the correction coefficient $\alpha_X$ (=the correction coefficient in an area X where the pixel is located) from the signal intensity of the first signal corresponding to the quantity of the subject light rays.

Figure 6:
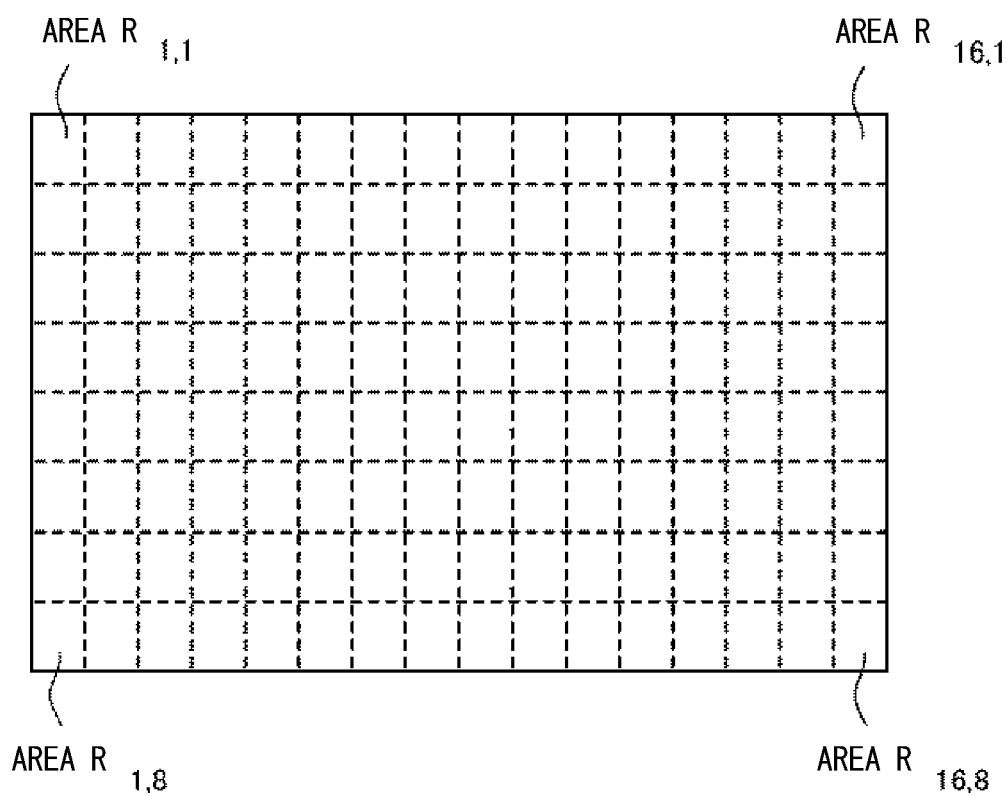
FIG. 6 illustrates a first example in which a light-receiving region is divided into areas.

Now, some examples of setting areas in the light-receiving region 212 will be described. FIG. 6 illustrates a first example in which the light-receiving region 212 is divided into areas. As illustrated in FIG. 6, in the first example, the rectangular light-receiving region 212 is divided into (m×n) areas with m areas in the lateral direction (m=16 in the illustrated example) and n areas in the longitudinal direction (n=8 in the illustrated example). With a given area expressed by $R_{i,j}$ (1≤i≤m, 1≤j≤n), the correction coefficient $\alpha_{i,j}$ corresponding to each area may be collected in advance through an experiment. For example, a pixel signal of a pixel belonging to an area $R_{3,7}$ is output as (first signal)−$\alpha_{3,7}$×(second signal).

Figure 7:
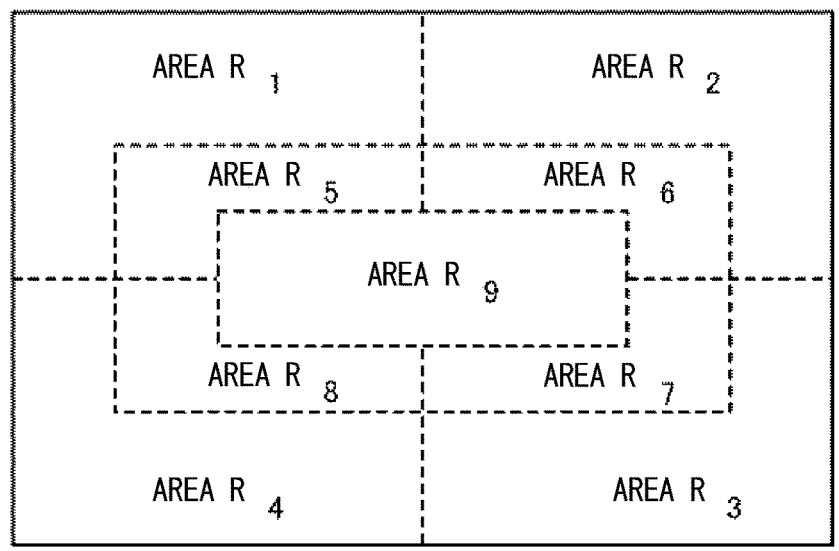
FIG. 7 illustrates a second example in which a light-receiving region is divided into areas.

FIG. 7 illustrates a second example in which the light-receiving region 212 is divided into areas. As illustrated in FIG. 2, the circuits constituting the image sensor 200 are disposed in the peripheral portion of the light-receiving region 212 or stacked in the thickness direction of the light-receiving region 212. Some of the circuits may emit heat upon being driven. Therefore, the separation between the shading appearing when a dark-current component is contained and the shading appearing when no dark-current component is contained may exhibit a tendency that varies along the radiation direction from the center portion of the light-receiving region 212.

In the second example, the light-receiving region 212 is divided into areas in the radiation direction from its center portion. For example, as illustrated in FIG. 7, areas $R_1$ to $R_9$ can be set from the upper left area toward the center portion in a spiral manner. With a given area expressed by $R_i$ (1≤i≤m, m=9 in the illustrated example), the correction coefficient $\alpha_i$ corresponding to each area may be collected in advance through an experiment. For example, a pixel signal of a pixel belonging to an area $R_3$ is output as (first signal)−$\alpha_3$×(second signal).

Figure 8:
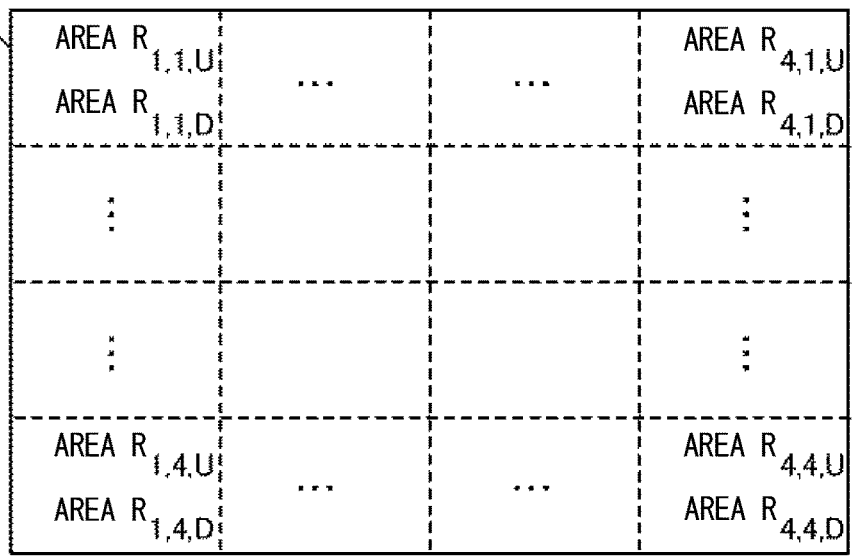
FIG. 8 illustrates a third example in which a light-receiving region is divided into areas.

FIG. 8 illustrates a third example in which the light-receiving region 212 is divided into areas. In the case of the image sensor 200 supporting two-channel readout described with reference to FIG. 2, output signals of the pixels in the odd columns are read out to the first readout circuit 221, and output signals of the pixels in the even columns are read out to the second readout circuit 222, for example. Therefore, the separation between the shading appearing when a dark-current component is contained and the shading appearing when no dark-current component is contained may exhibit a different tendency depending on to which of the first readout circuit 221 and the second readout circuit 222 an output signal is read out.

In the third example, the light-receiving region 212 is divided into (m×n) rectangular areas as in the first example, and then each of the areas is further divided into a group constituted by the pixels of which output signals are read out by the first readout circuit 221 and a group constituted by the pixels of which output signals are read out by the second readout circuit 222. In other words, the pixels that share the output wire 361, or the output signal line, are grouped together to form an area. In FIG. 8, with the former being a U group, a given area is expressed by $R_{i,j,U}$, and with the latter being a D group, a given area is expressed by $R_{i,j,D}$ in a similar manner. As with the first example and the second example, the correction coefficient $\alpha_{i,j,U}$ or $\alpha_{i,j,D}$ corresponding to each area may be collected in advance through an experiment. For example, a pixel signal of a pixel belonging to an area $R_{2,1,D}$ is output as (first signal)−$\alpha_{2,1,D}$×(second signal). When more readout circuits are provided, each area may be divided into groups in accordance with the number of the readout circuits. In addition, the grouping in accordance with the readout circuits may be applied also to the area division of the second example. Furthermore, the first example to the third example are not limiting, and areas may be divided in accordance with the characteristics of the image sensor 200 and/or the result of an experiment conducted in advance. Then, a correction coefficient corresponding to each area may be determined.

In an experiment conducted in advance, the shading appearing when a dark-current component is contained and the shading appearing when no dark-current component is contained are investigated with various analog gains and charge accumulation periods that can be set and with various expected use temperatures, and the correction coefficient α of each area divided as described above is determined. In other words, the correction coefficient of each area is determined in accordance with each of a different charge accumulation period (e.g., 1/60 seconds, 1/120 seconds, . . . ), a different gain (e.g., 16 dB, 17 dB, . . . ), and a different temperature (e.g., 0° C., 5° C., 10° C., . . . ). When the set analog gain is small, each correction coefficient α takes a similar value. Therefore, when a threshold is set for the analog gain and the analog gain is smaller than that threshold, a common correction coefficient α for all the areas may be determined. If the image sensor 200 includes a memory, the determined correction coefficient α may be stored in this memory. If that is not the case, the correction coefficient α may be stored in the flash memory 180 and transmitted to the image sensor 200 as necessary under the control of the control unit 150.

Figure 9:
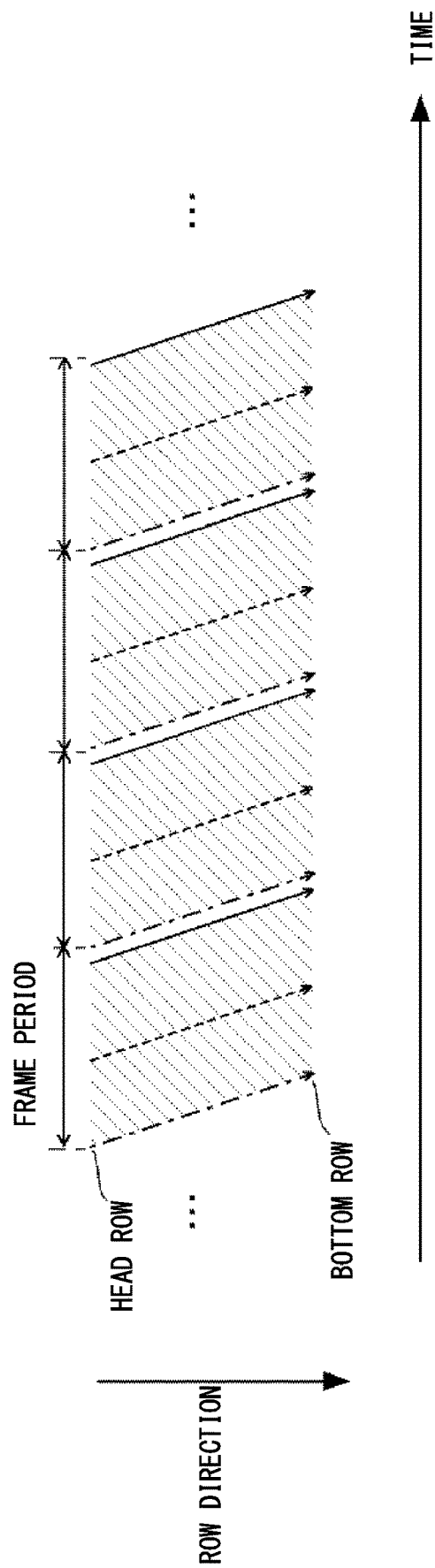
FIG. 9 illustrates an operational concept according to a first example of a moving-image capturing operation.

Now, some examples of a moving-image capturing operation through a rolling shutter system will be described. FIG. 9 illustrates an operational concept according to a first example of a moving-image capturing operation. The horizontal axis indicates the passage of time. In the range indicated as the row direction in the vertical axis direction, an operation of each of, in order from the top, the first row (head row), the second row, the third row, . . . , and the nth row (bottom row) of pixel units 301 arrayed in the pixel region 210 is indicated in the horizontal axis direction (time axis direction). A plurality of pixel units 301 arrayed in the same row are subjected to simultaneous timing control. Meanwhile, pixel units 301 arrayed in different rows are subjected to different timing control.

In the present embodiment, the control circuit 250 reads out output signals from the pixel units 301 in a rolling shutter system, and the buffer memory 120 collects these output signals to generate one frame image data. The image processing unit 130 seams together these pieces of frame image data to generate moving image data.

This will be described in more concrete terms. As indicated by the dashed-dotted lines, the control circuit 250 applies a reset pulse to the reset transistor 353 successively from the head row to the bottom row on a row-by-row basis. In other words, the control circuit 250 starts the processing for outputting the first signal described above. Through the control of the control circuit 250, a reset pulse is applied to each pixel unit 301, and the transfer transistor 351 is turned off. Then, the photodiode 311 starts accumulating charges corresponding to the quantity of the incident light.

While the photodiode 311 is accumulating charges (the periods indicated by hatching) upon the transfer transistor 351 having been turned off, the control circuit 250 executes the processing for outputting the second signal described above, as indicated by the dotted lines. Specifically, the control circuit 250 applies a reset pulse to the reset transistor 353 successively from the head row to the bottom row on a row-by-row basis and resets the floating diffusion 360. Thereafter, the reset transistor 353 is turned off, and a selection pulse is applied to the selection transistor 355 to transmit a signal potential of the floating diffusion 360 to the output wire 361. This signal potential serves as a reference potential. Thereafter, after a predetermined duration, the potential of the floating diffusion 360 is transmitted to the output wire 361. This potential serves as a signal potential. The CDS processing is performed with these signals of the two output lines obtained in this manner. In other words, the reference potential is removed from the signal potential.

Thereafter, a signal that has passed through a readout circuit, such as an analog amplifier, and the ADC is output to the buffer memory 120 (the output of the second signal).

The output of the second signal means that a normal readout operation has been performed with no transfer being made as the transfer transistor 351 is kept off. Since the potential is read out from the floating diffusion 360 twice at substantially the same timing and the CDS processing is performed on these potentials, all the pixels are supposed to result in 0. In reality, however, signals in which the level of 0 is not equal is obtained in each pixel. This is because the characteristics of the circuits following the amplification transistor 354 vary and the value varies depending on the path through which the signal has passed.

When a predetermined charge accumulation period (=shutter period) has passed, the control circuit 250 causes the first signal corresponding to the accumulated charges to be transmitted to the output wire 361 on a row-by-row basis from the head row to the bottom row, as indicated by the solid lines. First, the reset transistor 353 is turned on for a short duration to reset the floating diffusion 360. The reset transistor 353 is turned off, and the selection transistor 355 is turned on to cause a reference potential to be transmitted to the output wire 361. Then, through the control of the control circuit 250, each pixel unit 301 turns on the transfer transistor 351, transfers the accumulated charges to the floating diffusion 360, and causes the signal potential of the floating diffusion 360 to be transmitted to the output wire 361 at a timing at which a selection pulse is applied to the selection transistor 355. This signal potential serves as the signal potential. The CDS processing is performed with the transmitted two signals, and a signal that has passed through a readout circuit, such as an analog amplifier, and the ADC is output to the buffer memory 120 (the output of the first signal).

The image processing unit 130, serving as a correction unit, includes a potential holding unit that holds a first signal and a second signal for each output wire 361. The image processing unit 130 acquires the correction coefficient α corresponding to the position of the read-out pixel unit 301 from the control unit 150 and generates a pixel signal by subtracting a correction amount that is the product of the signal intensity of the second signal and the correction coefficient α from the signal intensity of the first signal. The generated pixel signal is output to the control unit 150. The control unit 150 provides, to the image processing unit 130, in addition to the position of the pixel unit 301, the correction coefficient α corresponding to the set analog gain and charge accumulation period and the temperature measured by the temperature sensor 240.

Figure 10:
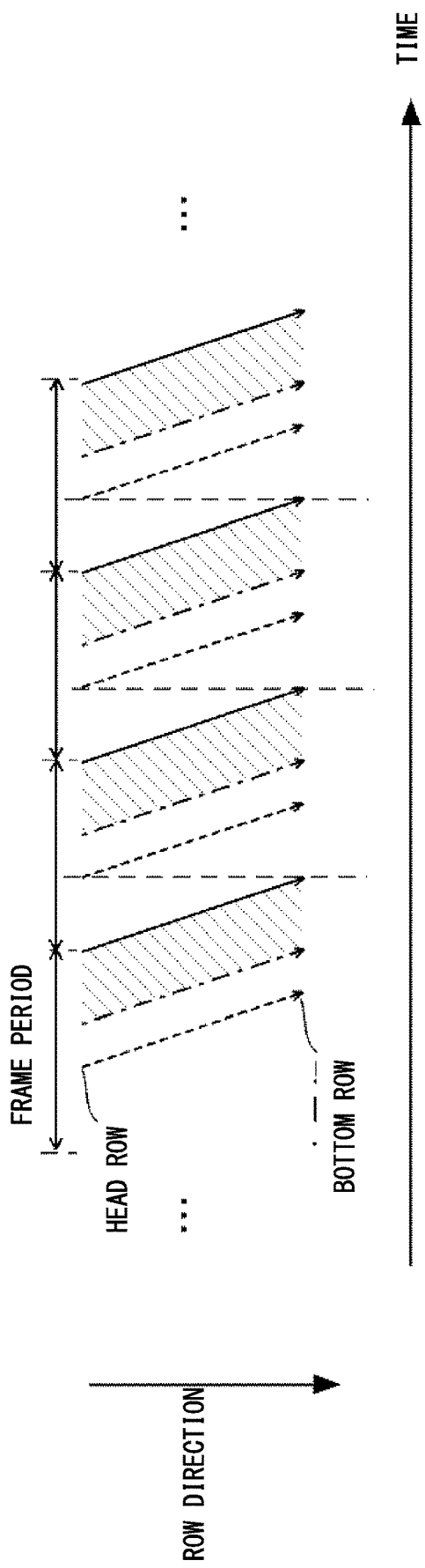
FIG. 10 illustrates an operational concept according to a second example of a moving-image capturing operation.

FIG. 10 illustrates an operational concept according to a second example of a moving-image capturing operation. In the second example, the charge accumulation period is shorter than that in the first example illustrated in FIG. 9. For example, when the charge accumulation period in the first example is 1/60 seconds, the charge accumulation period in the second example is 1/120 seconds. In the first example, the readout timing of the first signal and the readout timing of the second signal are kept from overlapping each other in the same row by completing output processing of the second signal while the output processing of the first example is being executed. However, when the charge accumulation period is short, the readout timing of the first signal and the readout timing of the second signal end up overlapping each other in the same row through the above processing. Accordingly, the control circuit 250 first executes the output processing of the second signal and then executes the output processing of the first signal such that the readout timing of the second signal and the readout timing of the first signal do not overlap each other in the same row in one frame period. In other words, the control circuit 250 performs the output processing of the second signal in a non-charge accumulation period in the pixel units 301.

For example, as indicated by the dashed lines perpendicular to the time axis in FIG. 10, after the readout of the first signal in the bottom row is completed in a given frame period, the readout processing of the second signal in the head row is started in the next frame period. Such processing can also cause each pixel unit 301 to output the first signal and the second signal in one frame period. In other words, the first readout circuit 221 and the second readout circuit 222 can generate a pixel signal of each pixel unit 301, as in the first example.

Figure 11:
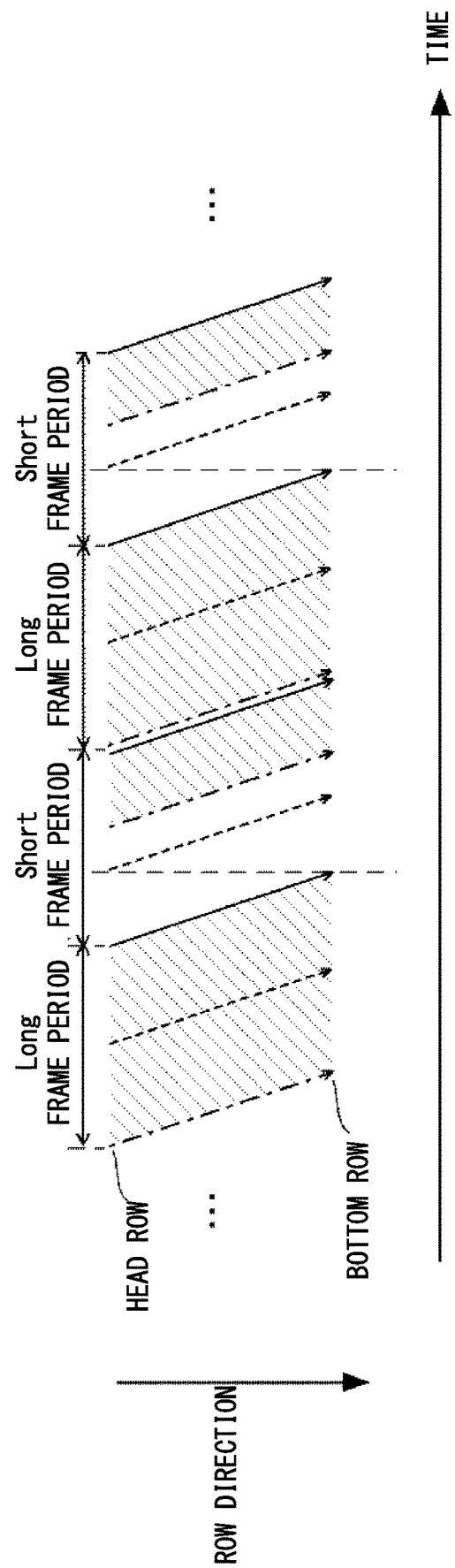
FIG. 11 illustrates an operational concept according to a third example of a moving-image capturing operation.

FIG. 11 illustrates an operational concept according to a third example of a moving-image capturing operation. In the third example, a frame period in which charges are accumulated for an extended duration as in the first example illustrated in FIG. 9 and a frame period in which charges are accumulated for a short duration as in the second example illustrated in FIG. 10 are repeated in an alternating manner. A frame period with a long charge accumulation period is referred to as a long frame period, and a frame period with a short charge accumulation period is referred to as a short frame period. An image with a wide dynamic range can be obtained by performing so-called high dynamic range (HDR) processing on and combining a frame image output in a long frame period and a frame image output in a short frame period.

In the third example, the control circuit 250 repeats the control in the first example and the control in the second example described above in an alternating manner. Here, as indicated by the dashed lines perpendicular to the time axis in FIG. 11, after the readout of the first signal in the bottom row is completed in a given long frame period, the readout processing of the second signal in the head row is started in a subsequent short frame period. Such processing makes it possible to output a pixel signal corresponding to a long frame period and a pixel signal corresponding to a short frame period. The image processing unit 130 generates an HDR frame image by combining a long frame image and a short frame image output in this manner.

Figure 12:
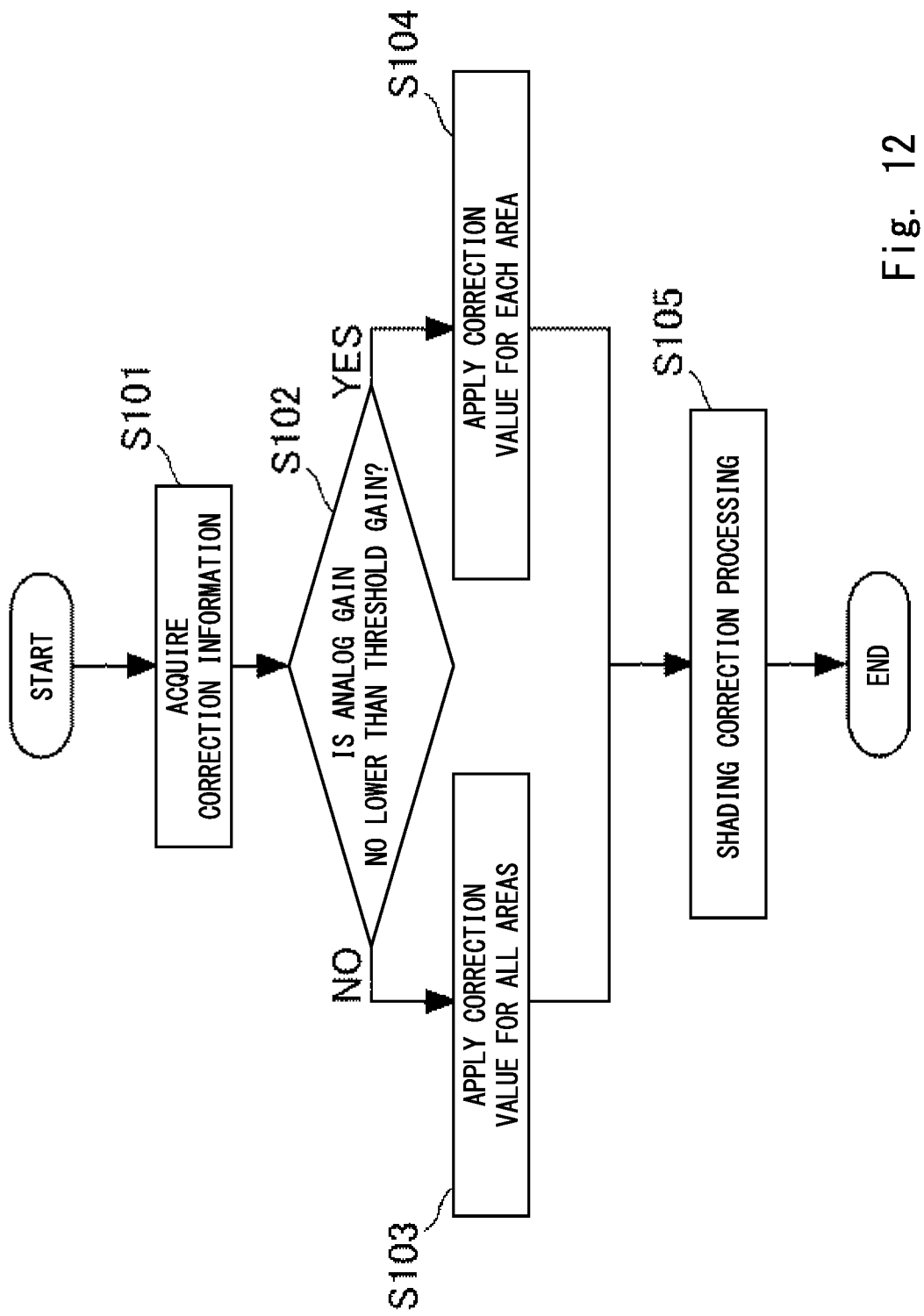
FIG. 12 is a flowchart illustrating shading correction processing on one frame.

Now, a flow of shading correction processing on one frame period will be described. FIG. 12 is a flowchart illustrating shading correction processing on one frame period. In step S101, the control unit 150 acquires correction information prior to the processing on one frame period. Specifically, the control unit 150 acquires the set analog gain and charge accumulation period from the control unit 150 and acquires the current temperature from the temperature sensor 240. Then, in step S 102, the control unit 150 determines whether the acquired analog gain is no lower than a threshold gain set in advance.

If the control unit 150 has determined that the acquired analog gain is lower than the threshold, the flow proceeds to step S103, and the control unit 150 acquires a correction coefficient α to be applied commonly to all the areas from a memory storing the correction coefficient α. If the control unit 150 has determined that the acquired analog gain is no lower than the threshold, the flow proceeds to step S104, and the control unit 150 acquires correction coefficients α for respective areas from a memory storing the correction coefficients α, so that the correction values can be applied to the respective areas.

In step S105, the control unit 150 supplies, as appropriate, the correction coefficient α acquired in step S103 or step S104 to the shading correction processing of each pixel executed by the image processing unit 130. The flow is terminated upon the completion of shading correction processing on one frame.

A second embodiment will be described. In the second embodiment, configurations that differ from the configurations of the first embodiment will be described. Configurations that are not noted in particular are similar to the configurations of the first embodiment.

Unlike the image sensor 200 according to the first embodiment, an image sensor 200 of an imaging device 100 according to the second embodiment is not capable of so-called double-speed driving in which a signal can be read out twice in one frame period. In other words, a signal can be read out only once in one frame period. Even with such a restriction, the shading correction processing such as the one described above can be performed in some cases in a mode in which frame combining of combining a frame image output in a long frame period with a long charge accumulation period and a frame image output in a short frame period with a short charge accumulation period in performed. This processing will be described below.

Figure 13:
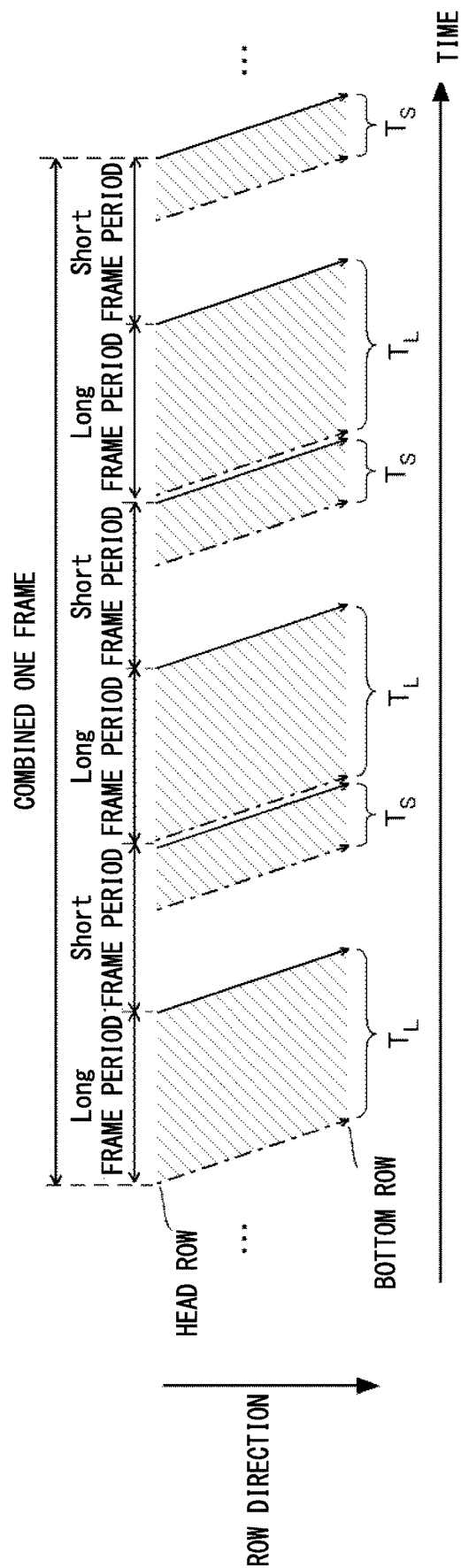
FIG. 13 illustrates an operational concept of normal processing performed when frames are combined.

FIG. 13 illustrates an operational concept of normal processing performed when frames are combined. When frames are to be combined, in normal processing, a long frame period with a charge accumulation period of $T_L$ (e.g., 1/60 seconds) and a short frame period with a charge accumulation period of $T_S$ ($<T_L$, e.g., 1/120 seconds) are repeated in an alternating manner. In other words, the control circuit 250 performs, in an alternating manner in each of the consecutive frame periods, first frame control of causing each pixel unit 301 to output a first signal in a first charge accumulation period $T_L$ and second frame control of causing each pixel unit 301 to output a first signal in a second charge accumulation period $T_S$ that is shorter than the first charge accumulation period $T_L$.

In the present embodiment, when three frames corresponding to long frame periods and three frames corresponding to short frame periods are accumulated in the buffer memory 120, the image processing unit 130 combines these frames into one frame. With such combining processing, although the frame rate is reduced, a high-quality combined frame image with low noise and with wide dynamic range can be generated.

Figure 14:
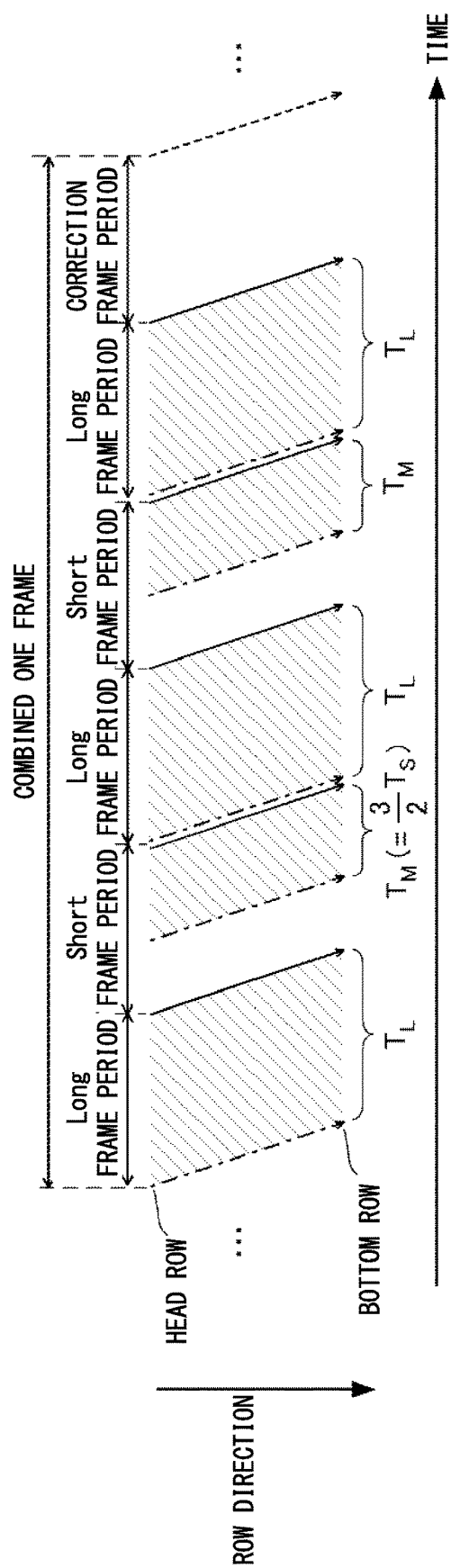
FIG. 14 illustrates an operational concept of shading readout performed when frames are combined.

As illustrated in FIG. 13, there is no timing for outputting a second signal in the normal processing. Therefore, when the control circuit 250 has received an instruction signal periodically from the control unit 150, for example, the control circuit 250 executes shading readout of reading out a second signal. FIG. 14 illustrates an operational concept of the shading readout performed when frames are combined.

As illustrated in FIG. 14, even when the control circuit 250 has received an instruction signal, the control circuit 250 executes the first frame control with a charge accumulation period of $T_L$ in a long frame period. Meanwhile, in two of the three short frame periods, the control circuit 250 executes third frame control of causing each pixel unit 301 to output a first signal in a third charge accumulation period $T_M$ that is longer than the second charge accumulation period $T_S$ but shorter than the first charge accumulation period $T_L$. Then, with the remaining one of the three short frame periods serving as a correction frame period, the control circuit 250 executes fourth frame control of causing each pixel unit 301 to output a second signal indicating the potential of the floating diffusion that has been reset. In other words, to generate one combined frame image, the control circuit 250 executes sequentially the first frame control (long frame period), the third frame control (short frame period), the first frame control (long frame period), the third frame control (short frame period), the first frame control (long frame period), and the fourth frame control (correction frame period) in accordance with an instruction signal of the control unit 150.

In the first embodiment, the image processing unit 130 generates a pixel signal by subtracting a correction amount that is the product of the signal intensity of a second signal and a correction coefficient α from the signal intensity of a first signal. In the second embodiment as well, the image processing unit 130 executes the shading correction processing on an output signal of each frame period stored in the buffer memory 120.

Specifically, the image processing unit 130, for corresponding pixels, decides a pixel value of these pixels by subtracting a correction amount that is the product of the signal intensity of a second signal output in the fourth frame control and a correction coefficient α corresponding to the pixel position, the charge accumulation period, and so on from the signal intensity of a first signal output in the first frame control. In a similar manner, the image processing unit 130, for corresponding pixels, decides a pixel value of these pixels by subtracting a correction amount that is the product of the signal intensity of a second signal output in the fourth frame control and a correction coefficient α corresponding to the pixel position, the charge accumulation period, and so on from the signal intensity of a first signal output in the third frame control. When five frame images corrected in this manner are combined, a combined frame image in which shading has been corrected can be obtained.

If the second signal of each pixel obtained in the fourth frame control is stored in the buffer memory 120, the shading correction processing can be preformed also on a frame image in the normal processing described with reference to FIG. 13. Specifically, the image processing unit 130, for corresponding pixels, decides a pixel value of these pixels by subtracting a correction amount that is the product of the signal intensity of a second signal output in the fourth frame control in the shading readout and a correction coefficient α corresponding to the pixel position, the charge accumulation period, and so on from the signal intensity of a first signal output in the first frame control in the normal processing. In a similar manner, the image processing unit 130, for corresponding pixels, decides a pixel value of these pixels by subtracting a correction amount that is the product of the signal intensity of a second signal output in the fourth frame control in the shading readout and a correction coefficient α corresponding to the pixel position, the charge accumulation period, and so on from the signal intensity of a first signal output in the second frame control in the normal processing. When six frame images corrected in this manner are combined, a combined frame image in which shading has been corrected can be obtained in the normal processing as well.

One combined frame in the normal processing is a combined frame of three long frame images in the first frame control and three short frame images in the second frame control, and thus the total charge accumulation period of that combined frame is $3 \times T_L + 3 \times T_S$. Meanwhile, one combined frame in the shading readout is a combined frame of three long frame images in the first frame control and two short frame images in the third frame control, and thus the total charge accumulation period of that combined frame is $3 \times T_L + 2 \times T_M$. Therefore, when $3 \times T_S \neq 2 \times T_M$, a variation in the luminance arises between combined frames unless the luminance is adjusted. In other words, when a moving image is captured in which a combined frame image is formed by combining a frame image with a long charge accumulation period and a frame image with a short charge accumulation period, a variation in the luminance arises between combined frame images if a noise image for a dark shading correction is acquired in place of some frame images.

Therefore, when three short frame periods in the normal processing are changed to two short frame periods and one correction frame period in the shading readout, it is preferable that $T_M = (3/2) \times T_S$ hold. Adjusting the charge accumulation period in this manner can achieve $3 \times T_S = 2 \times T_M$. In other words, a variation in the luminance between combined frames can be substantially eliminated. To rephrase, if the third charge accumulation period $T_M$ is determined based on the charge accumulation period that falls short as the fourth frame control is performed, a variation in the luminance between combined frames can be substantially eliminated.

Although six frame periods serve as a unit period for one combined frame in the foregoing examples, a unit period may include more frame periods. For example, when eight frame periods serve as a unit period for one combined frame, four long frame images obtained in the first frame control and four short frame images obtained in the second frame control are combined in the normal processing. In the shading readout, four long frame images obtained in the first frame control and three short frame images obtained in the third frame control are combined. In the correction frame period, a second signal is output from each pixel in the fourth frame control, as described above.

The control unit 150 transmits an instruction signal to the control circuit 250, for example, every two unit periods of one combined frame. In this case, the control circuit 250 executes the normal processing and the shading readout in an alternating manner every unit period. Alternatively, the control unit 150 may transmit an instruction signal to the control circuit 250 in accordance with an occurrence of what may cause shading to change. For example, the control unit 150 may transmit an instruction signal each time a change in the temperature detected by the temperature sensor 240 exceeds a threshold. Furthermore, an instruction signal may be generated not by the control unit 150 but by the control circuit 250 itself. Although the shading correction processing is performed in the buffer memory 120 in the foregoing description, if the image sensor 200 includes a frame buffer memory for several frames, the shading correction processing may be performed in the image sensor 200.

The correction frame period may replace any short frame period and does not need to replace the last short frame period in a unit period of one combined frame. Furthermore, the second signal acquired in the correction frame period may be used not in the shading correction processing of a first signal acquired in a frame period leading up to that point as described above but in the shading correction processing of a first signal acquired in a frame period following that point. In that case, if the potential holding unit included in each of the first readout circuit 221 and the second readout circuit 222 holds the second signal for a predetermined duration, the shading correction processing on the first signal updated every frame period thereafter can be executed in the first readout circuit 221 and the second readout circuit 222. The second signal is updated each time the fourth frame control is executed.

Figure 15:
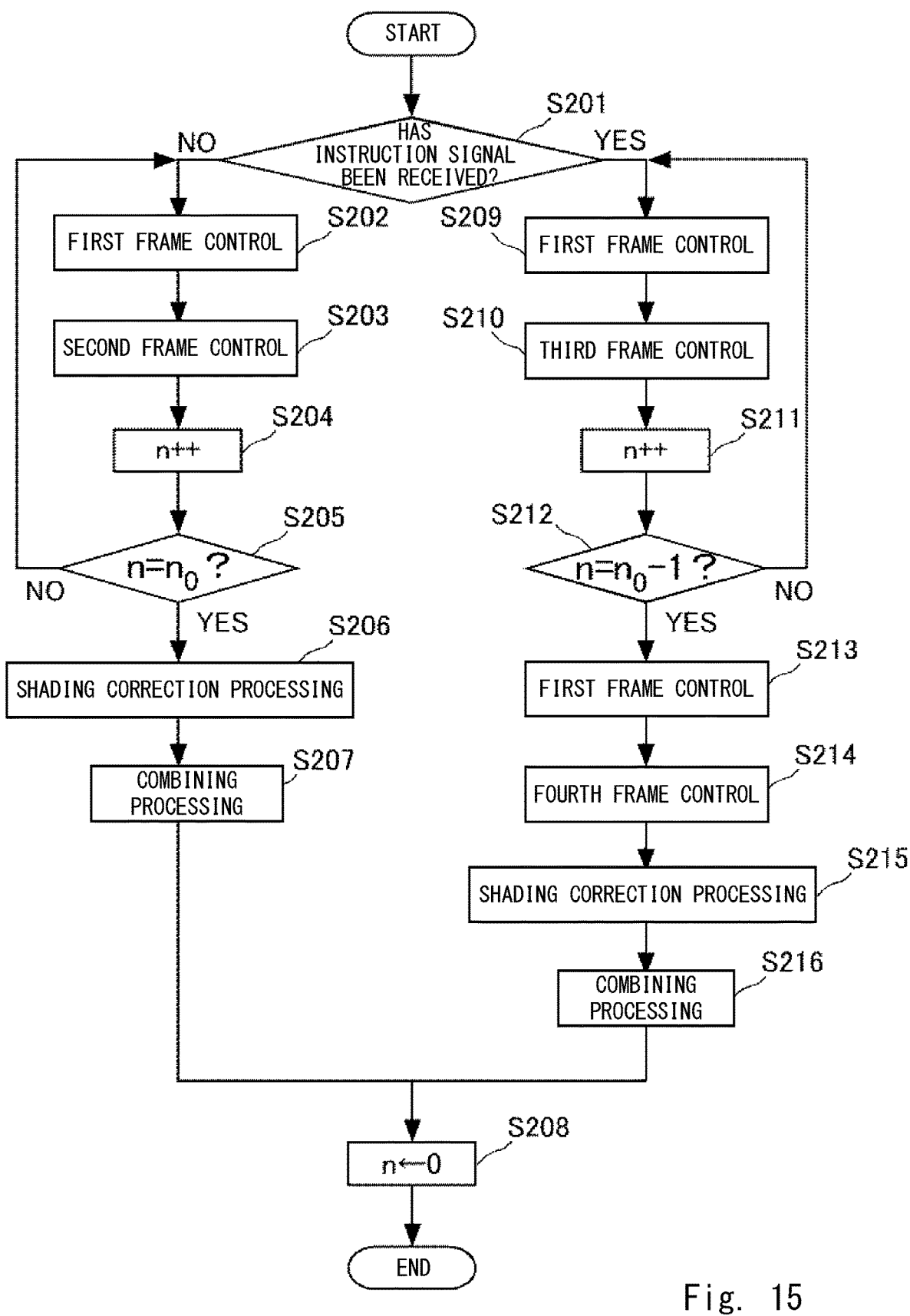
FIG. 15 is a flowchart illustrating frame combining processing performed when frames are combined.

Now, a flow of processing performed up to a point when one combined frame image is generated will be described. FIG. 15 is a flowchart illustrating frame combining processing performed when frames are combined. In step S201, the control circuit 250 determines whether the control circuit 250 has received an instruction signal. If the control circuit 250 has not received any instruction signal, the control circuit 250 proceeds to step S202 to perform the normal processing. If the control circuit 250 has received an instruction signal, the control circuit 250 proceeds to step S209 to perform the shading readout processing.

In step S202, the control circuit 250 executes the first frame control in a long frame period and obtains a long frame image. Then, in step S203, the control circuit 250 executes the second frame control in a short frame period and obtains a short frame image. In step S204, the control circuit 250 increments a count variable n. In step S205, the control circuit 250 determines whether the count variable n has reached predetermined $n_0$. If it is determined that the count variable n has not reached the predetermined $n_0$, the control circuit 250 returns to step S202 and repeats the first frame control and the second frame control. If it is determined that count variable n has reached the predetermined $n_0$, the control circuit 250 proceeds to step S206. Here, $n_0$ is 3 if three long frame images and three short frame image are to be combined or is 4 if four long frame images and four short frame images are to be combined.

In step S206, the image processing unit 130 executes the shading correction processing on the long frame images and the short frame images accumulated in the buffer memory 120. Specifically, the image processing unit 130 decides a pixel value of each pixel by subtracting a correction amount that is the product of the signal intensity of the second signal of a corresponding pixel stored upon being acquired in the fourth frame control already executed and the correction coefficient α selected in accordance with various conditions from the signal intensity of the first signal of each pixel in each frame image. Then, in step S207, the image processing unit 130 combines the frame images subjected to the shading correction processing to generate one combined frame image. Upon a combined frame image having been generated, the flow proceeds to step S208 to reset the count variable n, and the processing is then terminated.

Meanwhile, in step S209, the control circuit 250 executes the first frame control in a long frame period and obtains a long frame image. Then, in step S210, the control circuit 250 executes the third frame control in a short frame period and obtains a short frame image. In step S211, the control circuit 250 increments the count variable n. In step S212, the control circuit 250 determines whether the count variable n has reached $n_0-1$ relative to predetermined $n_0$. If it is determined that the count variable n has not reached the predetermined $n_0$, the control circuit 250 returns to step S209 and repeats the first frame control and the third frame control. If it is determined that count variable n has reached the predetermined $n_0$, the control circuit 250 proceeds to step S213. In step S213, the control circuit 250 further executes the first frame control and obtains a long frame image. Then, in step S214, the control circuit 250 executes the fourth frame control as a correction frame period and obtains the second signal from each pixel.

In step S215, the image processing unit 130 executes the shading correction processing on the long frame images and the short frame images accumulated in the buffer memory 120. Specifically, the image processing unit 130 decides a pixel value of each pixel by subtracting a correction amount that is the product of the signal intensity of the second signal of a corresponding pixel acquired in the fourth frame control in step S214 and the correction coefficient α selected in accordance with various conditions from the signal intensity of the first signal of each pixel in each frame image. Then, in step S216, the image processing unit 130 combines the frame images subjected to the shading correction processing to generate one combined frame image. Upon a combined frame image having been generated, the flow proceeds to step S208 to reset the count variable n, and the processing is then terminated.

A third embodiment will be described. In the third embodiment, configurations that differ from the configurations of the first embodiment will be described. Configurations that are not noted in particular are similar to the configurations of the first embodiment.

Figure 16:
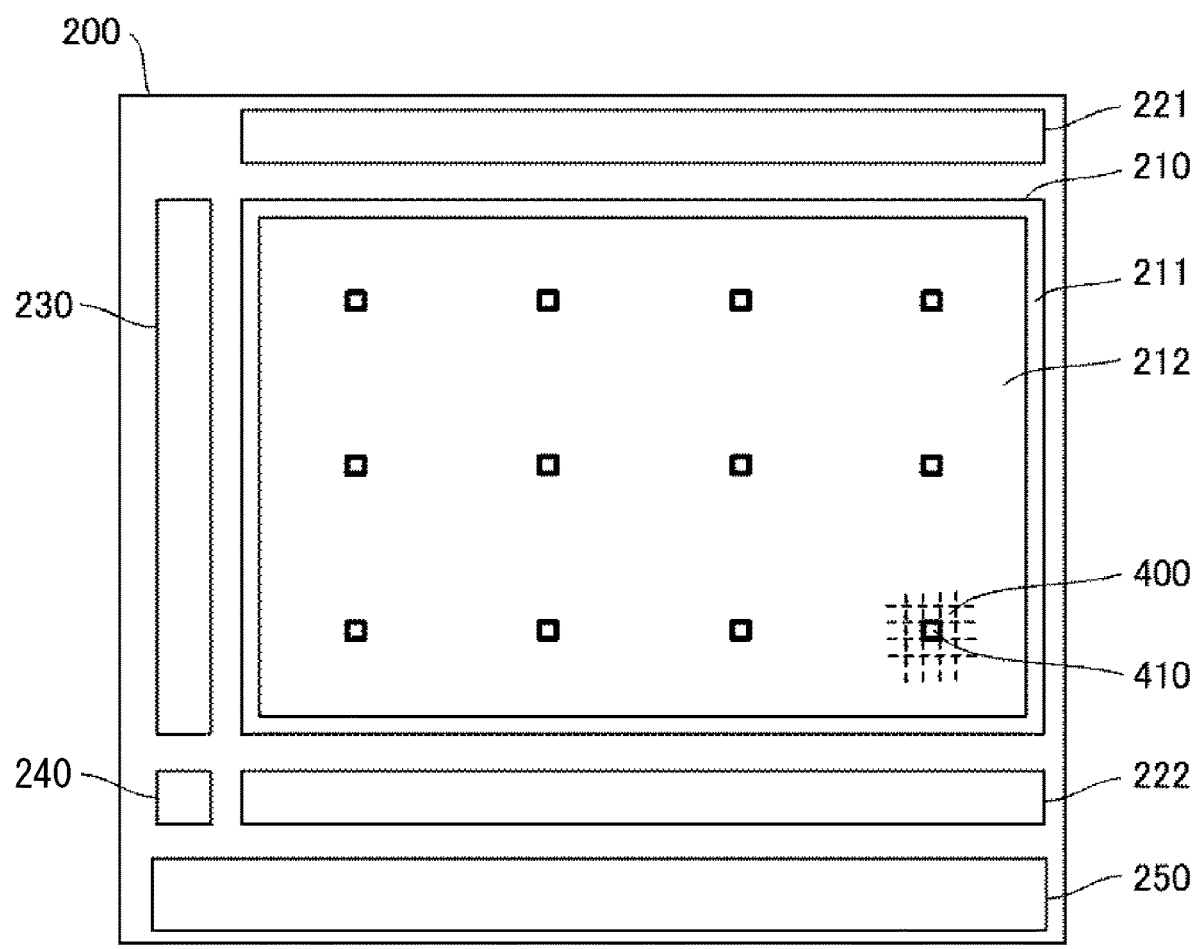
FIG. 16 is a schematic diagram of an image sensor that includes a light-blocking pixel in a light-receiving region.

Unlike the image sensor 200 according to the first embodiment, an image sensor 200 of an imaging device 100 according to the third embodiment includes light-blocking pixels interspersed in a light-receiving region 212. FIG. 16 is a schematic diagram of the image sensor 200 that includes light-blocking pixels 410 in the light-receiving region 212. Each light-blocking pixel 410 includes a cutoff unit that cuts off incident light, and the incident light thus does not reach a photodiode 311 of the light-blocking pixel 410. Each light-blocking pixel 410 is surrounded on its periphery by normal pixels 400. Each normal pixel 400 photoelectrically converts the incident light that reaches the photodiode 311 therein. As described with reference to FIG. 3, the light-blocking pixel 410 has a circuit configuration similar to that of the normal pixel 400. Therefore, readout from the light-blocking pixel 410 is controlled in a manner similar to the readout from the normal pixel 400 via the first readout circuit 221 and the second readout circuit 222.

Figure 17:
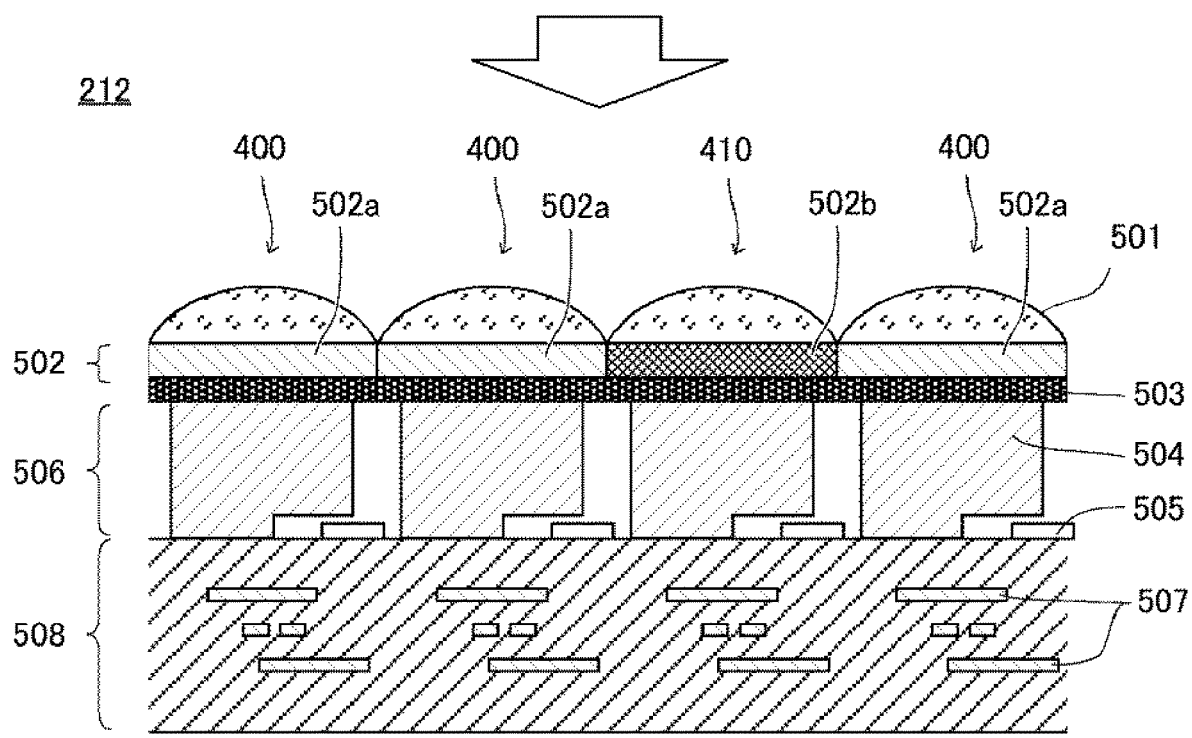
FIG. 17 is a sectional view of a light-receiving region of an image sensor taken in the vicinity of a light-receiving surface.

FIG. 17 is a sectional view of the light-receiving region 212 of the image sensor 200 taken in the vicinity of the light-receiving surface. In the present embodiment, the image sensor 200 is a back illuminated MOS image sensor. The incident light enters mainly in the direction indicated by the white arrow.

A photodiode layer 506 is disposed upstream from a wiring layer 508 in the direction of the incident light. The photodiode layer 506 includes a plurality of photodiodes 504 disposed in a two-dimensional array and transistors 505 provided for the respective photodiodes 504. Each photodiode 504 corresponds to the photodiode 311 in the circuit configuration diagram illustrated in FIG. 3, and each transistor 505 corresponds to the transfer transistor 351 and so on.

A filter layer 502 is provided upstream from the photodiode layer 506 in the direction of the incident light with a passivation film 503 provided therebetween. The photodiodes 504 constitute respective pixels. Among these pixels, a pixel provided with a color filter 502a in FIG. 17 is a normal pixel 400, and a pixel provided with a non-transmissive light-blocking filter 502b that cuts off the incident light is a light-blocking pixel 410. There are a plurality of types of color filters 502a that transmit light in different wavelength ranges (e.g., three types including red, blue, and green), and the color filters 502a are disposed in a specific array corresponding to the respective photodiodes 504.

Microlenses 501 corresponding to the respective pixels are provided upstream from the filter layer 502 in the direction of the incident light. Each microlens 501 condenses incident light toward its corresponding photodiode 504. Since no incident light reaches the photodiode 504 in the light-blocking pixel 410, no microlens 501 needs to be provided in the light-blocking pixel 410. The wiring layer 508 includes wires 507 that transmit signals from the photodiode layer 506 to the first readout circuit 221 or the second readout circuit 222. There may be multiple layers of the wires 507.

The image sensor 200 according to the present embodiment corrects an output signal of the normal pixel 400 with the use of an output signal of the light-blocking pixel 410, unlike the image sensor 200 according to the first embodiment or the second embodiment that causes one pixel to output a first signal and a second signal. The output of the light-blocking pixel 410 corresponds to the shading obtained when light is blocked as indicated by the solid line in FIGS. 4 and 5. Thus, a pixel signal of the normal pixel 400 having shading corrected is obtained by subtracting the signal intensity of an output signal output by a nearby light-blocking pixel 410 from the signal intensity of an output signal (=first signal) of the normal pixel 400. A frame image lacks a pixel value corresponding to the position of the light-blocking pixel 410, but this may be compensated through interpolation processing where the pixel values of surrounding normal pixels are used.

Figure 18:
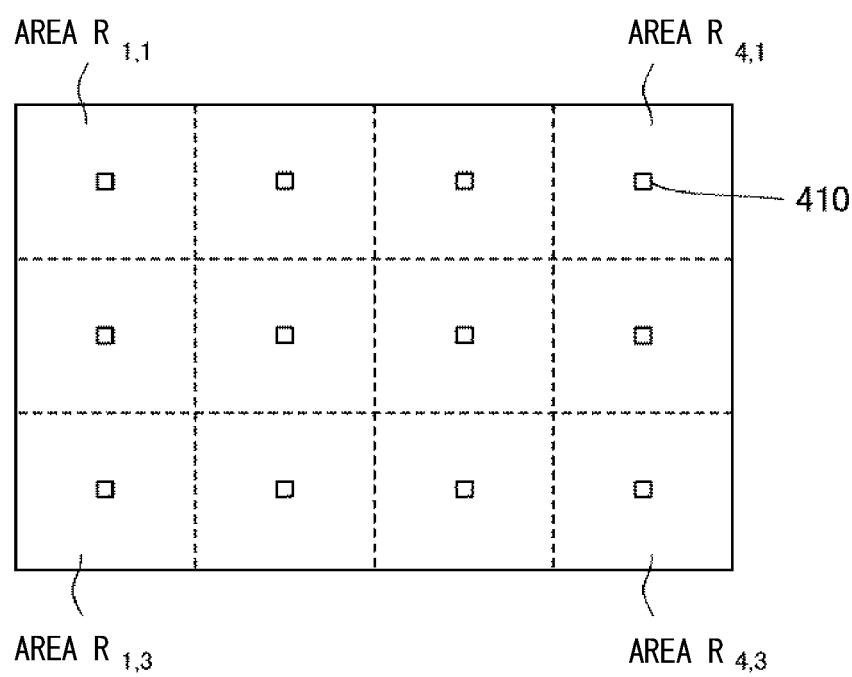
FIG. 18 illustrates a relationship between a light-blocking pixel and area division in a light-receiving region.

FIG. 18 illustrates a relationship between the light-blocking pixels 410 and the area division in the light-receiving region 212. As illustrated in FIG. 18, the rectangular light-receiving region 212 is divided into (m×n) areas with m areas in the lateral direction (m=4 in the illustrated example) and n areas in the longitudinal direction (n=3 in the illustrated example). A given area is expressed by $R_{i,j}$ (1≤i≤m, 1≤j≤n). A light-blocking pixel 410 is disposed near the center of each area. To rephrase, the light-receiving region 212 is divided into areas in accordance with the positions of the light-blocking pixels 410.

Output signals of the normal pixels 400 belonging to a given area are subjected to the shading correction processing by the output signal of the light-blocking pixel 410 belonging to that area. For example, the output signals of the normal pixels 400 belonging to an area $R_{3,1}$ are subjected to the shading correction processing by the output signal of the light-blocking pixel 410 that also belongs to the area $R_{3,1}$. The way how the light-receiving region 212 is divided into areas may follow the example illustrated in FIG. 7 or the example illustrated in FIG. 8.

Figure 19:
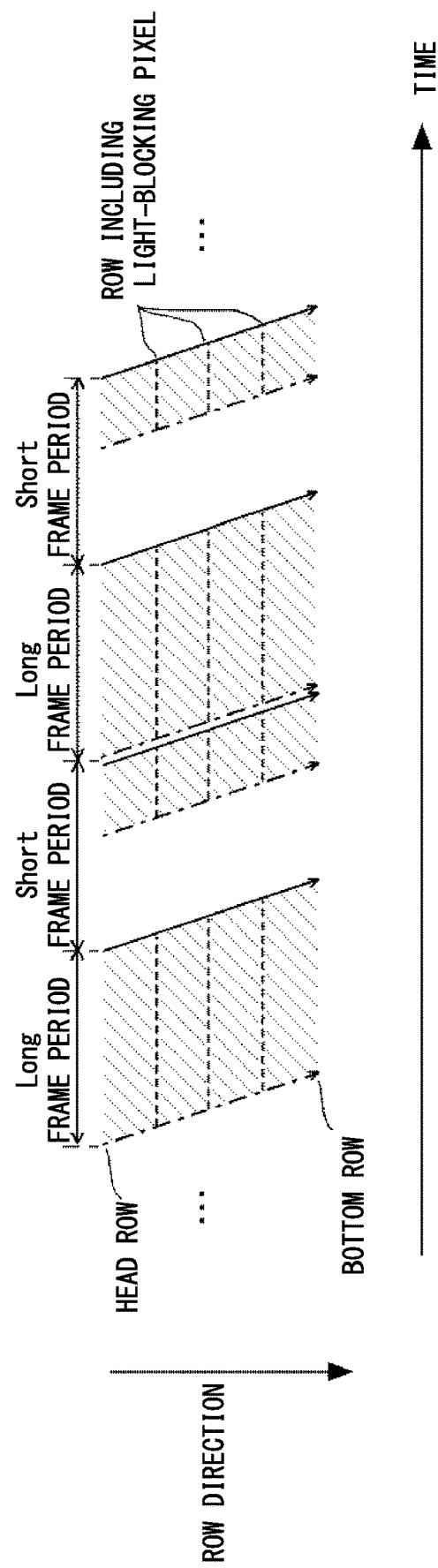
FIG. 19 illustrates an operational concept of a moving-image capturing operation of a rolling shutter system.

FIG. 19 illustrates an operational concept of a moving-image capturing operation of a rolling shutter system according to the present embodiment. As in the example illustrated in FIG. 11, described below is a case in which frame combining of combining a frame image output in a long frame period with a long charge accumulation period and a frame image output in a short frame period with a short charge accumulation period is performed.

When frames are combined, a long frame period with a charge accumulation period of $T_L$ (e.g., 1/60 seconds) and a short frame period with a charge accumulation period of $T_S$ (<$T_L$, e.g., 1/120 seconds) are repeated in an alternating manner. In other words, the control circuit 250 performs, in an alternating manner in each of consecutive frame periods, the long frame control of causing each normal pixel 400 to output an output signal in the first charge accumulation period $T_L$ and the short frame control of causing each normal pixel 400 to output an output signal in the second charge accumulation period $T_S$.

In the long frame control, the light-blocking pixel 410 outputs a shading signal with the charge accumulation period $T_L$ that is the same as that of the normal pixels 400. Therefore, subtracting the shading signal output by the light-blocking pixel 410 in a given area from the signal intensity of the output signal of the normal pixel 400 output in the same long frame period results in a pixel signal in which the shading has been substantially removed. In the short frame control, the light-blocking pixel 410 outputs a shading signal with the charge accumulation period $T_S$ that is the same as that of the normal pixels 400. Therefore, subtracting the shading signal output by the light-blocking pixel 410 in a given area from the signal intensity of the output signal of the normal pixel 400 output in the same short frame period results in a pixel signal in which the shading has been substantially removed.

When the signal level of the light-blocking pixel 410 differs from the mean of the shading distribution of the normal pixels 400 within the same area, a variation may arise among areas after the shading correction. In this case, a plurality light-blocking pixels 410 may be provided for each area, and their mean signal value may be obtained. Alternatively, shading of the normal pixels 400 within the same area may be measured in advance, and their mean value may be compared against the signal value of the light-blocking pixel 410 to obtain a correction coefficient β for each area. Then, a numerical value obtained by multiplying the signal value of the light-blocking pixel 410 by the correction coefficient β may be used in the shading correction. It is more preferable that the correction coefficient β be set in accordance with the temperature and the analog gain.

Then, the image processing unit 130 combines the frames corresponding to the long frame periods and the frames corresponding to the short frame periods accumulated in the buffer memory 120 into one frame. With such combining processing, a high-quality combined frame image with low noise and with wide dynamic range can be generated.

In the case described in the present embodiment, one light-blocking pixel 410 is included in one area. In this case, the control circuit 250 preferably monitors a change in the output signal of the light-blocking pixel 410 and determines whether any anomalous value is output. For example, when an amount of change in a given output signal is extremely smaller than an amount of change in an output signal output by another light-blocking pixel 410 or when an amount of change in a given output signal shows a completely different tendency, the control circuit 250 determines the output signal of the light-blocking pixel 410 to be an anomaly. When the control circuit 250 has determined the output signal of a given light-blocking pixel 410 to be an anomaly, the shading correction processing may be executed on the output signals of the normal pixels 400 belonging to the same area as the given light-blocking pixel 410 with the use of the output signal of a light-blocking pixel 410 belonging to a surrounding area. When the potential holding unit of each of the first readout circuit 221 and the second readout circuit 222 is configured to be capable of executing such processing, the shading correction processing may be executed by the first readout circuit 221 and the second readout circuit 222. In other cases, the image processing unit 130 may execute the shading correction processing on a frame image accumulated in the buffer memory 120.

If a plurality of light-blocking pixels 410 are disposed in one area, even when an output signal of one light-blocking pixel 410 is determined to be an anomaly, an output signal of another light-blocking pixel 410 can be used. When the imaging device 100 is a three-CCD camera, that is, when the imaging device 100 includes an image sensor for outputting a red component, an image sensor for outputting a green component, and an image sensor for outputting a blue component, these image sensors may be so disposed as to keep corresponding pixels from serving as light-blocking pixels.

Figure 20:
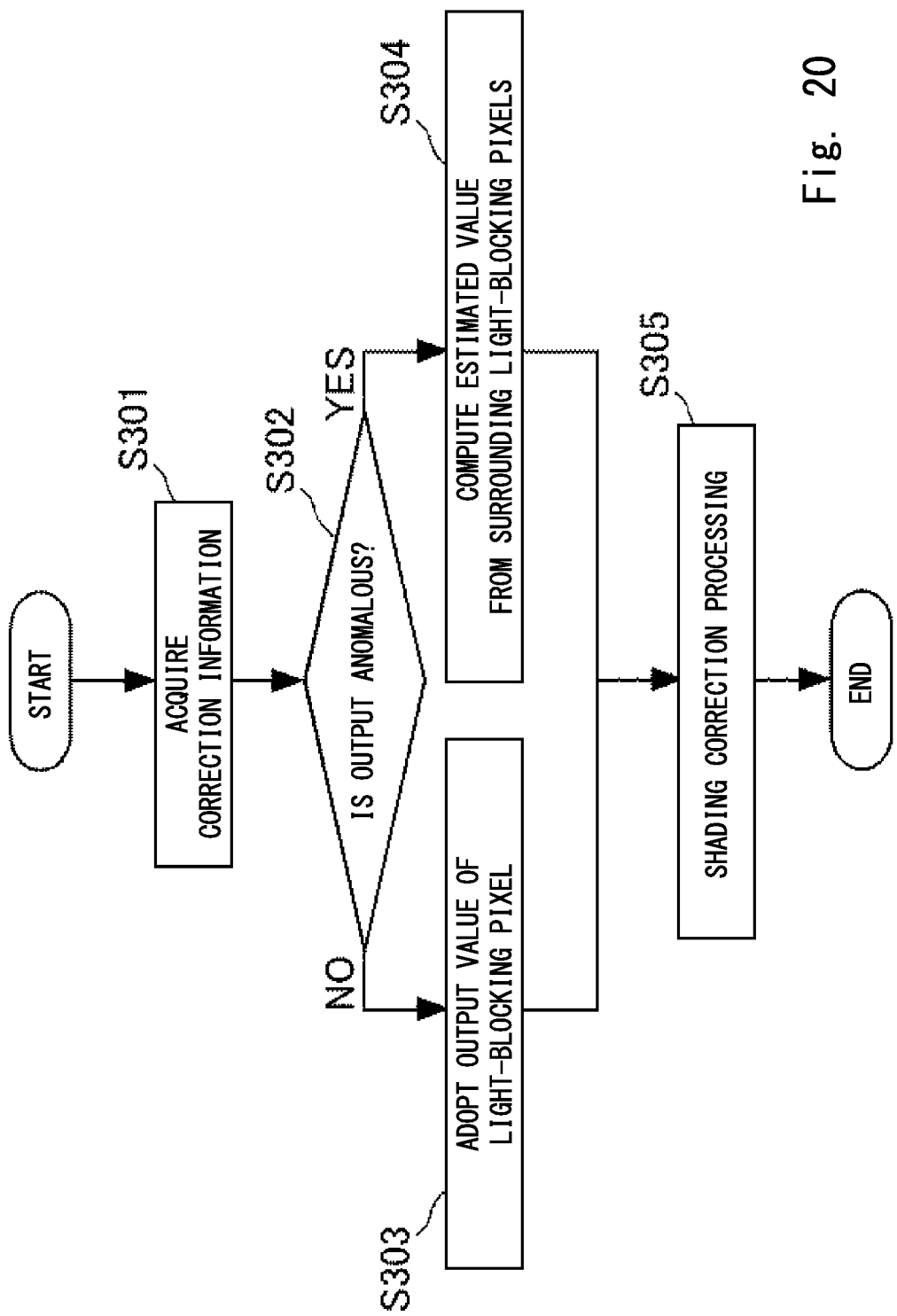
FIG. 20 is a flowchart illustrating shading correction processing on one frame.

FIG. 20 is a flowchart illustrating the shading correction processing on one frame according to the present embodiment. In step S301, the control circuit 250 acquires correction information prior to the processing in one frame period. Then, in step S302, the control circuit 250 makes an anomaly determination as to whether the output signal of the light-blocking pixel 410 included in the same area as the normal pixels 400 on which the shading correction processing is to be performed is anomalous. If it is determined that the output signal is not anomalous, the control circuit 250 adopts the output value of this light-blocking pixel 410 in step S303 and performs the shading correction processing in step S305.

When it is determined in step S302 that the output signal is anomalous, the control circuit 250 proceeds to step S304 and uses the output values of the light-blocking pixels 410 belonging to the surrounding areas. Here, a weighting average is calculated from the output values of the light-blocking pixels 410 included in the respective surrounding areas in accordance with conditions such as the distance, and the calculated value serves as an estimated output value of the light-blocking pixel 410 that has been determined to be anomalous. In step S305, the control circuit 250 performs the shading correction processing with the use of this estimated output value. The flow is terminated upon the completion of the shading correction processing on one frame.

A fourth embodiment will be described. In the fourth embodiment, configurations that differ from the configurations of the first embodiment will be described. Configurations that are not noted in particular are similar to the configurations of the first embodiment. In the present embodiment, shading correction processing is performed without causing each pixel to output a second signal and without providing a light-blocking pixel in a light-receiving region. This processing will be described below.

As described above, the pixel region 210 of the image sensor 200 includes the OB region 211, and a pixel belonging to the OB region 211 (referred to as an OB pixel) also outputs a signal every frame period. However, since the OB region 211 is so provided as to border the periphery of the light-receiving region 212, it is difficult to directly estimate the shading of each pixel belonging to the light-receiving region 212 based on an output signal output from an OB pixel in each frame period.

Meanwhile, it is possible to collect data on the output of an OB pixel and the output of a normal pixel belonging to the light-receiving region 212 with the light-receiving surface of the image sensor 200 being shaded from light and under varied conditions at a stage prior to when the image sensor 200 is embedded into the imaging device 100 as a product. Specifically, a data set on the detected temperature, the set amplification gain and charge accumulation period, the output signal value of the OB pixel, and the output signal value of the normal pixel can be collected.

Therefore, at a stage prior to when the image sensor 200 is embedded into the imaging device 100 as a product, the image sensor 200 is actually driven to prepare a number of pieces of training data of the data set described above, and a trained model is generated through supervised learning in advance. The trained model to be generated is a trained model that, upon receiving the output signal information of the OB pixel, the detected temperature, and the set amplification gain and charge accumulation period, outputs correction information for the output signal of the normal pixel.

Figure 21:
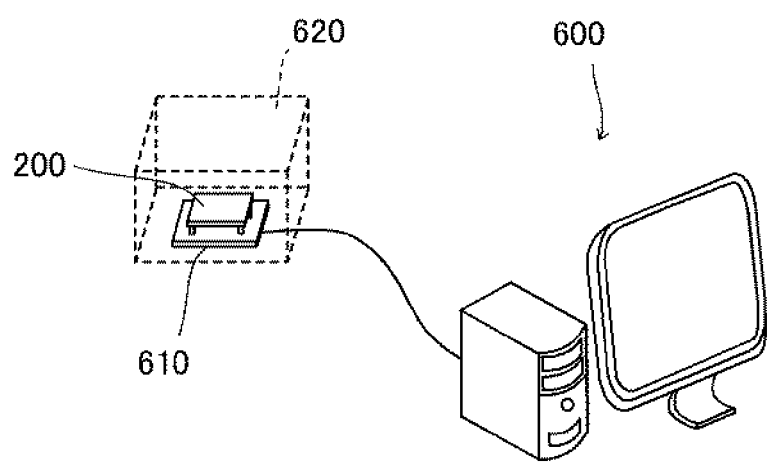
FIG. 21 is a conceptual diagram illustrating a situation in which training data is collected.

FIG. 21 is a conceptual diagram illustrating a situation in which training data is collected. As illustrated in FIG. 21, the image sensor 200 is connected to a control board 610. The control board 610 is connected to a tool PC 600. The image sensor 200 is controlled by the tool PC 600 via the control board 610 and transmits an output signal and so on to the tool PC 600. The image sensor 200, along with the control board 610, is housed in a black box 620 that cuts off outside light. Therefore, the image sensor 200 is driven without receiving any incident light. Following the structure of the imaging device 100, the black box 620 may have its conditions such as heat dissipation characteristics matched to those of the imaging device 100.

Specifically, the tool PC 600 drives the image sensor 200 while specifying various amplification gains and charge accumulation periods. Furthermore, the tool PC 600 acquires, for each frame control, the output signal value of the OB pixel, the output signal value of the normal pixel, and the temperature detected by the temperature sensor 240 from the image sensor 200. The tool PC 600 associates these pieces of information with the amplification gain and the charge accumulation period, which are the driving conditions, to create one data set and stores this data set. The temperature of the image sensor 200 rises with an increase in the driving time, and therefore it is preferable to acquire data sets corresponding to various temperatures varied by adjusting the driving time.

FIG. 22 is a conceptual diagram illustrating a data structure of training data. As described above, the tool PC 600 drives the image sensor 200 in various conditions and acquires a number of data sets. The tool PC 600 builds a data structure with these data sets serving as training data. Specifically, the tool PC 600 assigns a training data number to each of the acquired data sets and builds a data structure by lumping together the detected temperature, the set amplification gain and charge accumulation period, the output signal value of each OB pixel belonging to the OB region 211, and the output signal value of each normal pixel belonging to the light-receiving region 212.

The output signal value of each normal pixel belonging to the light-receiving region 212 is obtained by subjecting a signal output obtained with light being blocked to AD conversion and thus corresponds to the shading obtained when the light is blocked as indicated by the solid line in FIGS. 4 and 5. What is not obtained during an actual image capturing operation after the image sensor 200 is embedded into the imaging device 100 is this shading appearing when the light is blocked. If this shading can be estimated during an actual image capturing operation, shading correction processing can be performed by subtracting the estimated shading from a first signal indicating the signal intensity corresponding to the quantity of the incident light.

Accordingly, constructed in the present embodiment is a trained model that is a neural network that outputs shading upon receiving the detected temperature, the set amplification gain and charge accumulation period, and the output signal value of the OB pixel.

The tool PC 600 trains the neural network through supervised learning with, for each piece of training data, the detected temperature, the set amplification gain and charge accumulation period, and the output signal value of the OB pixel serving as input information and with the output of the shading value of the normal pixel serving as a correct output. For example, a weight serving as a coefficient is updated through backpropagation until the difference between the shading value of the normal pixel output by the model being trained as a predictive value and the actual shading value serving as the training data becomes no greater than a preset reference value. The trained model trained in this manner is mounted in the imaging device 100 along with the image sensor 200 actually used to acquire the information. The trained model is stored in the flash memory 180, read out by the control unit 150 at the time of the shading correction processing, and used for the shading correction processing.

Figure 23:
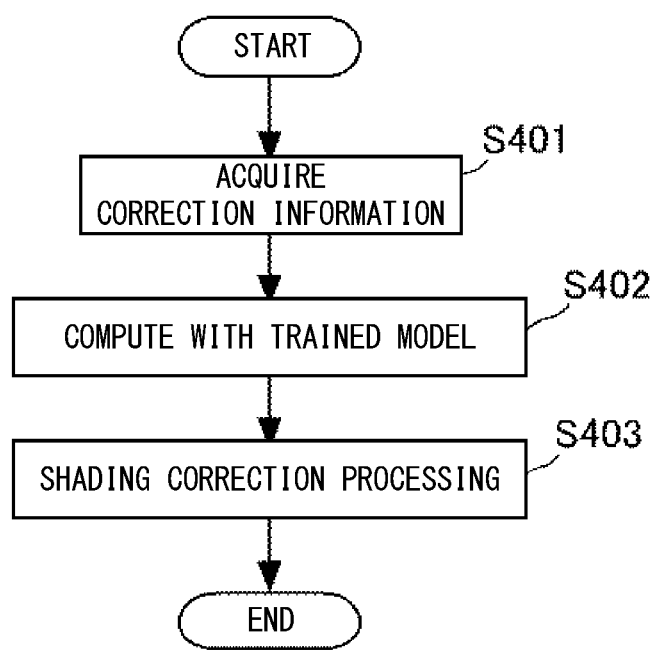
FIG. 23 is a flowchart illustrating shading correction processing in which a trained model is used.

FIG. 23 is a flowchart illustrating shading correction processing on one frame performed with the use of a trained model embedded in the imaging device 100. Upon a frame image for one frame period having been sent to the buffer memory 120, in step S401, the control circuit 250 acquires correction information pertaining to this frame image. Specifically, the control circuit 250 acquires the temperature detected by the temperature sensor 240 when the frame image is generated, the set amplification gain and charge accumulation period, and the output value of each OB pixel forming the peripheral portion of the frame image.

In step S402, the image processing unit 130 inputs the input information acquired in step S401 into the trained model read out from the flash memory 180 and causes the trained model to perform computation to output an estimated shading value of each normal pixel. Then, in step S403, the image processing unit 130 cuts out the peripheral portion corresponding to the OB region 211 from the frame image and subtracts each estimated shading value calculated in step S402 from the pixel value of each normal pixel belonging to the light-receiving region 212. The flow is terminated upon the completion of the shading correction processing on one frame.

In the present embodiment described above, the training data is collected with the use of the image sensor 200 to be embedded into the imaging device 100. Alternatively, training data collected with the use of another image sensor of the same type manufactured in the same manufacturing lot may be used, for example. Although it is expected that the trained model constructed in this case has reduced accuracy in estimating the shading correction value as compared with the trained model collected with the use of the image sensor 200 to be actually embedded, an improvement in the efficiency of manufacturing the imaging device 100 can be expected.

In addition, the shading value changes in accordance with the use history of the image sensor 200 or changes over time as well, and thus the embedded trained model may be corrected as appropriate based on such information. In this case, how the shading value changes in accordance with various use histories or changes over time is learned in advance with the use of another image sensor of the same type, and this learning result is stored into the flash memory 180 as a correction module. The control unit 150 selects, as appropriate, a correction module corresponding to the use history or the passage of time of the host device and corrects and updates the trained model. The imaging device 100 may acquire the correction module over a network. It is needless to say that components in each embodiment, if they can be combined, may be combined as appropriate for implementation.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An imaging device comprising:
a plurality of pixel units;
a control unit configured to control a signal output by each of the plurality of pixel units; and
a correction unit configured to correct the signal output by each of the plurality of pixel units to generate a pixel signal, wherein
each of the plurality of pixel units includes
a photoelectric conversion unit,
a transfer switch configured to transfer a charge generated in the photoelectric conversion unit to a floating diffusion, and
a reset switch configured to discharge the charge accumulated in the floating diffusion,
the control unit is configured to cause each of the plurality of pixel units to output a first signal and a second signal, the first signal being a potential of the floating diffusion held when the charge accumulated in the photoelectric conversion unit is transferred upon the transfer switch being closed, the second signal being a potential of the floating diffusion held when the reset switch is closed with the transfer switch being open, and
the correction unit is configured to generate, with respect to the first signal and the second signal output by each of the plurality of pixel units, the pixel signal by subtracting a correction amount from a signal intensity of the first signal, the correction amount being a product of a signal intensity of the second signal and a coefficient determined in advance in accordance with a position of each of the plurality of pixel units.

2. The imaging device according to claim 1, wherein the correction unit is configured to generate the pixel signal by subtracting a correction amount from the signal intensity of the first signal when an analog gain set for an output of the first signal and an output of the second signal is smaller than a predetermined threshold, the correction amount being a product of the signal intensity of the second signal and a common coefficient determined in advance for the plurality of pixel units.

3. The imaging device according to claim 1, further comprising a detection unit configured to detect a temperature in a vicinity of the plurality of pixel units, wherein
the correction unit is configured to calculate the correction amount with the use of the coefficient corresponding to a detection result of the detection unit.

4. The imaging device according to claim 1, wherein the correction unit is configured to calculate the correction amount with the use of the coefficient set for a group of pixels grouped by an output signal line shared thereby.

5. The imaging device according to claim 1, wherein the control unit is configured to cause the second signal to be output while the photoelectric conversion unit is accumulating the charge with the transfer switch being open.

6. The imaging device according to claim 1, wherein the control unit is configured to, when the first signal is to be output alternatingly in different charge accumulation periods, cause the second signal to be output in a non-charge accumulation period provided between a first charge accumulation period and a second charge accumulation period that is shorter than the first charge accumulation period.

* * * * *